(12) United States Patent
Rajan et al.

(10) Patent No.: US 11,907,555 B2
(45) Date of Patent: *Feb. 20, 2024

(54) HIGH PERFORMANCE, HIGH CAPACITY MEMORY MODULES AND SYSTEMS

(71) Applicant: Rambus Inc., San Jose, CA (US)

(72) Inventors: Suresh Rajan, San Jose, CA (US); Abhijit M. Abhyankar, Sunnyvale, CA (US); Ravindranath Kollipara, Palo Alto, CA (US); David A. Secker, San Jose, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,838

(22) Filed: Nov. 18, 2022

(65) Prior Publication Data

US 2023/0138512 A1 May 4, 2023

Related U.S. Application Data

(63) Continuation of application No. 16/880,244, filed on May 21, 2020, now Pat. No. 11,520,508, which is a
(Continued)

(51) Int. Cl.
*G06F 3/06* (2006.01)
*G06F 13/16* (2006.01)

(52) U.S. Cl.
CPC .......... *G06F 3/0635* (2013.01); *G06F 3/0613* (2013.01); *G06F 3/0656* (2013.01);
(Continued)

(58) Field of Classification Search
CPC .... G06F 3/0635; G06F 3/0613; G06F 3/0656; G06F 3/0673; G06F 13/1678; Y02D 10/00
See application file for complete search history.

(56) References Cited

U.S. PATENT DOCUMENTS 6,742,098 B1   5/2004   Halbert et al.
7,062,597 B2   6/2006   Perego et al.
(Continued)

OTHER PUBLICATIONS

Notification Concerning Transmittal of International Preliminary Report on Patentability dated Feb. 15, 2018 re: Int'l Appln. No. PCT/US16/042356. 7 Pages.
(Continued)

*Primary Examiner* — Zhuo H Li
(74) *Attorney, Agent, or Firm* — Silicon Edge Law Group LLP; Arthur J. Behiel

(57) ABSTRACT

Described are memory modules that include address-buffer components and data-buffer components that together support wide- and narrow-data modes. The address-buffer component manages communication between a memory controller and two sets of memory components. In the wide-data mode, the address-buffer enables memory components in each set and instructs the data-buffer components to communicate full-width read and write data by combining data from or to from both sets for each memory access. In the narrow-data mode, the address-buffer enables memory components in just one of the two sets and instructs the data-buffer components to half-width read and write data with one set per memory access.

18 Claims, 19 Drawing Sheets

Related U.S. Application Data continuation of application No. 15/745,396, filed as application No. PCT/US2016/042356 on Jul. 14, 2016, now Pat. No. 10,678,459.

(60) Provisional application No. 62/201,883, filed on Aug. 6, 2015.

(52) U.S. Cl.
CPC ........ G06F 3/0673 (2013.01); G06F 13/1678 (2013.01); *Y02D 10/00* (2018.01)

(56) References Cited

U.S. PATENT DOCUMENTS

| | | | |
|---|---|---|---|
| 8,028,144 B2 | 9/2011 | Hampel et al. | |
| 10,789,185 B2* | 9/2020 | Giovannini | G06F 13/4265 |
| 11,520,508 B2* | 12/2022 | Rajan | G06F 3/0635 |
| 2013/0036273 A1 | 2/2013 | Shaeffer | |
| 2014/0293671 A1 | 10/2014 | Perego et al. | |
| 2015/0206562 A1 | 7/2015 | Shaeffer | |
| 2018/0366181 A1* | 12/2018 | Ware | G11C 11/4093 |
| 2021/0397569 A1* | 12/2021 | Song | G06F 13/1684 |
| 2022/0043762 A1 | 2/2022 | Ware et al. | |

OTHER PUBLICATIONS

Notification of Transmittal of the International Search Report and the Written Opinion of the International Searching Authority dated Sep. 29, 2016 re Int'l. Appln. No. PCT/US16/042356. 8 Pages.

* cited by examiner

HIGH PERFORMANCE, HIGH CAPACITY MEMORY MODULES AND SYSTEMS

BACKGROUND

Personal computers, workstations, and servers are general-purpose devices that can be programmed to automatically carry out arithmetic or logical operations. These devices include at least one processor, such as a central processing unit (CPU), and some form of memory system. The processor executes instructions and manipulates data stored in the memory.

Memory systems commonly include a memory controller that communicates with some number of memory modules via multi-wire physical connections called "channels." Each memory module commonly includes dynamic random-access memory (DRAM) components mounted on a printed circuit board. Successive generations of DRAM components have benefitted from steadily shrinking lithographic feature sizes. Storage capacity and signaling rates have improved as a result.

One metric of memory-system design that has not shown comparable improvement is the number of modules one can connect to a single channel. Adding a module to a channel increases the "load" on that channel, and thus degrades signaling integrity and limits signal rates. The number of modules per memory channel has thus eroded with increased signaling rates.

DETAILED DESCRIPTION

Figure 1A:
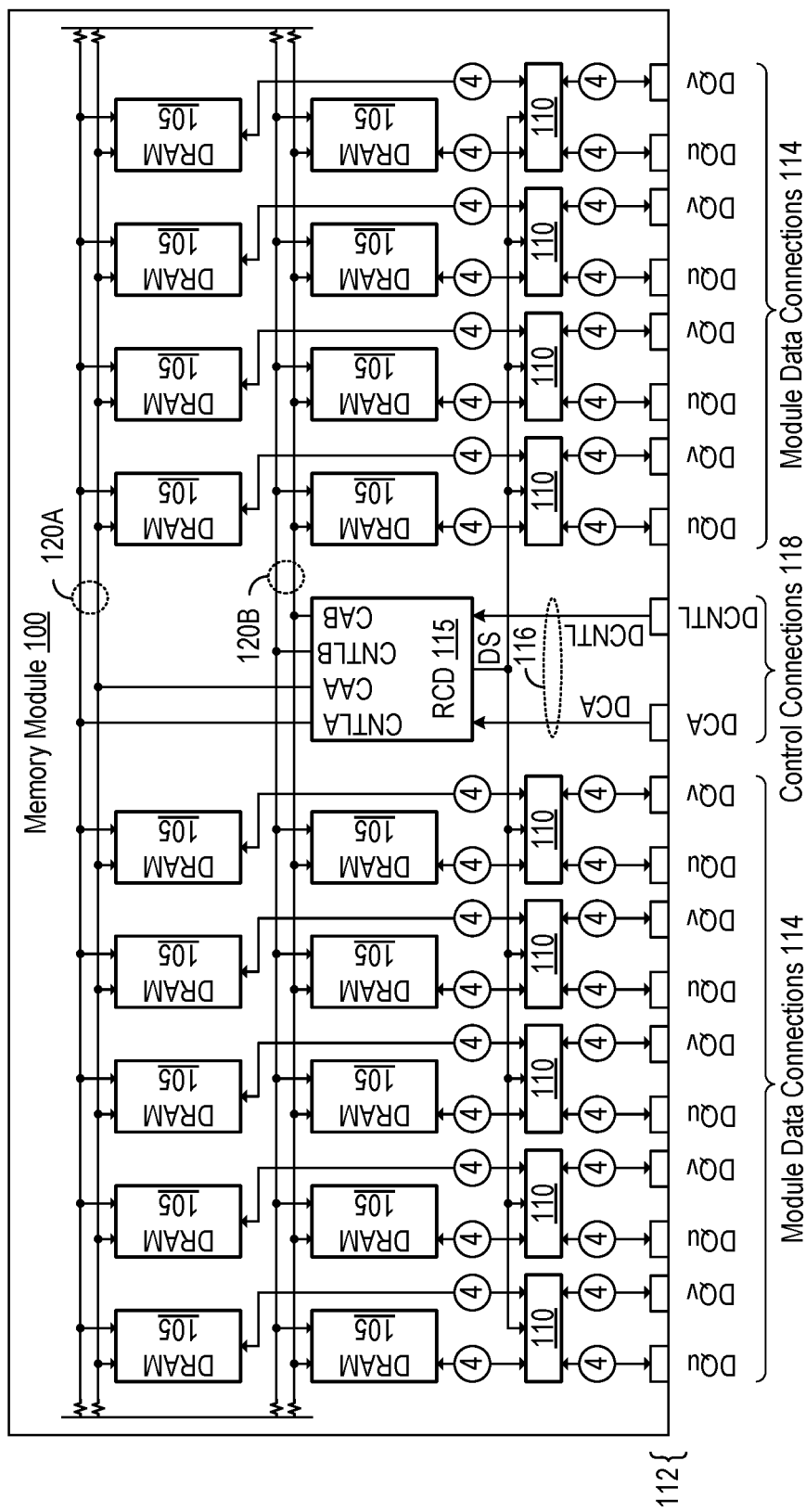
FIG. 1A depicts a memory module 100 that can be configured to support different data widths.

FIG. 1A depicts a memory module 100 that can be configured to support different data widths. In this example, module 100 supports a wide-data mode in which module 100 communicates nine eight-bit data bytes (72 data bits) in parallel, and is compatible with what is conventionally termed a "DDR4 LRDIMM chipset." DDR4 (for "double-data-rate, version 4") is a type of dynamic, random-access memory (DRAM) die, and LRDIMM (for "load-reduced, dual inline memory module") is a type of memory module that employs a separate system of buffers to facilitate communication with the memory dies. This backward compatibility is important because it allows module 100 to support an enormous and growing range of memory systems. Module 100 additionally supports a narrow-data mode in which module 100 communicates nine four-bit data nibbles (36 data bits) in parallel, and that can be used in support of improved signaling integrity, higher signaling rates, and increased system memory capacity.

Module 100 includes e.g. at least eighteen DRAM components 105 on one or each side. Each component 105 may include multiple DRAM die, or multiple DRAM stacked packages. Each DRAM component 105 communicates four-bit-wide (×4, or a "nibble"), though different data widths and different numbers of components and dies can be used in other embodiments. Components 105 can be mounted to one or both sides of module 100. Module 100 also includes nine data-buffer components 110, or "data buffers." Each data-buffer component 110 steers data, at the direction of steering signals DS in this example, from four DRAM components 105 to and from two data ports DQu and DQv of a module connector 112. Each DRAM component 105 communicates ×4 data. In the wide mode, each data-buffer component 110 communicates ×8 data from two simultaneously active DRAM components 105; in the narrow mode, each data-buffer component 110 communicates ×4 data from a single active DRAM component 105. Though not shown here, each DRAM component 105 also communicates a complementary pair of timing reference signals (e.g. strobe signals) that time the transmission and receipt of data signals.

A memory controller (not shown) directs command, address, and control signals on primary ports DCA and DCNTL to control the flow of data to and from module 100 via eighteen groups of data links DQu and DQv to module data connections 114. Address-buffer component 115, alternatively called a "Registering Clock Driver" (RCD), selectively interprets and retransmits the control signals on a module control interface 116 (signals DCA and DCNTL) from module control connections 118 and communicates appropriate command, address, control, and clock signals to a first set of memory components 105 via a first memory-component control interface 120A and to a second set of memory components via a second memory-component control interface 120B. Addresses associated with the commands on primary port DCA identify target collections of memory cells (not shown) in components 105, and chip-select signals on primary port DCNTL and associated with the commands allow address-buffer component 115 to select individual integrated-circuit DRAM dies, or "chips," for both access and power-state management. Data-buffer components 110 and address-buffer component 115 each acts as a signal buffer to reduce loading on module connector 112. This reduced loading is in large part because each buffer component presents a single load to module connector 112 in lieu of the multiple DRAM dies each buffer component serves.

Each of the nine data-buffer components 110 communicates eight-wide data for a total of 72 data bits. In general, N*64 data bits are encoded into N*72 signals, where N is an integer larger than zero (in modern systems, N is usually 1 or 2), where the additional N*8 data bits allow for error detection and correction. For example, a form of ECC developed by IBM and given the trademark Chipkill™ can be incorporated into module 100 to protect against any single memory die failure, or to correct multi-bit errors from any portion of a single memory die. Data-buffer components 110 can steer data as necessary to substitute a failed or impaired die. ECC support can be omitted in other embodiments.

Figure 1B:
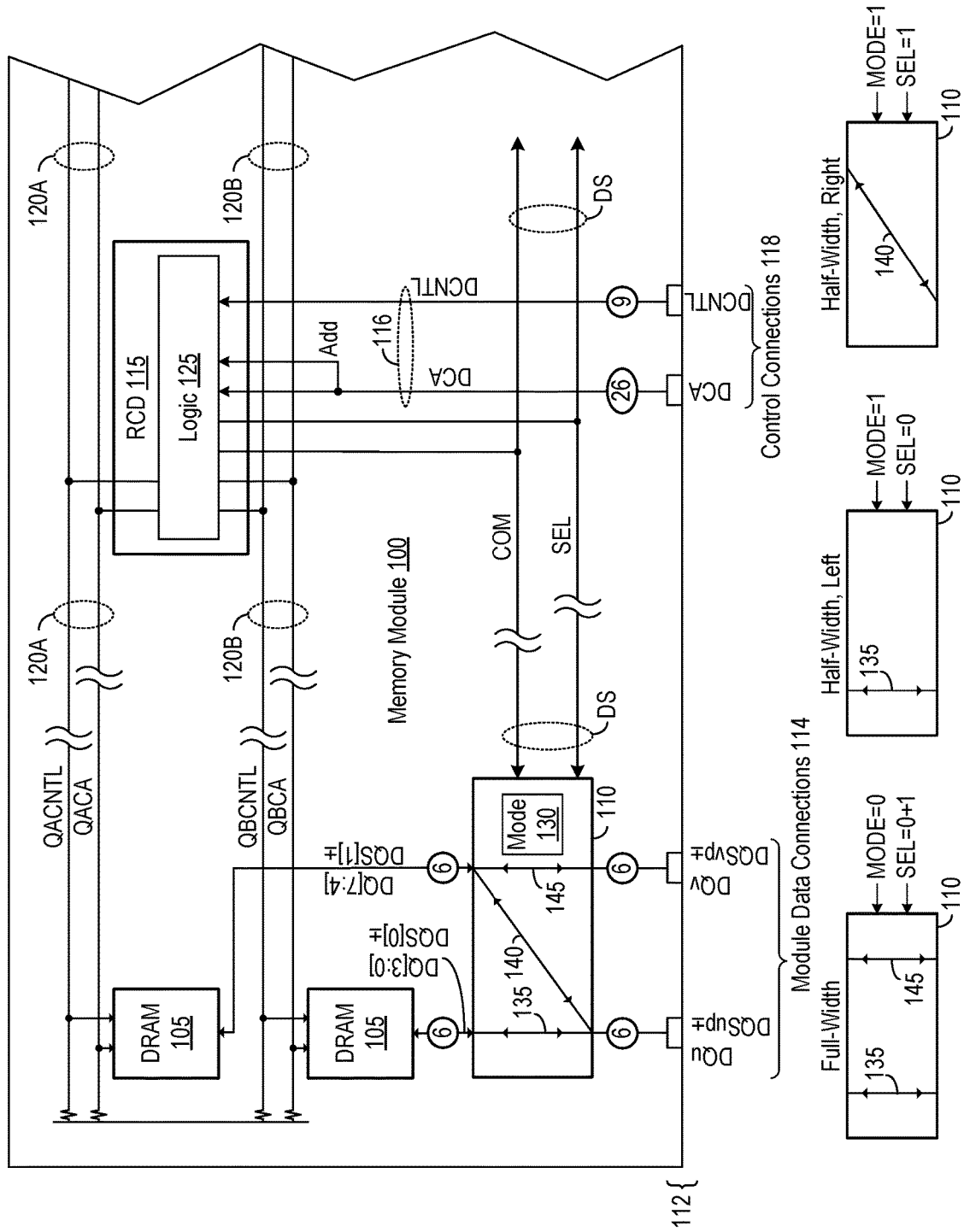
FIG. 1B depicts a portion of the left side of module 100 of FIG. 1A enlarged and edited for ease of illustration.

FIG. 1B depicts a portion of the left side of module 100 of FIG. 1A enlarged and edited for ease of illustration. As noted above, module 100 is backward compatible with the DDR4 LRDIMM chipset. Those of skill in the art are familiar with both DDR4 memory and LRDIMM modules, so detailed treatments of these technologies are omitted here. The following discussion highlights aspects of DDR4 LRDIMM circuitry relevant to certain improvements.

Data-buffer components 110 are disposed across the bottom of module 100 to minimize conductor lengths and concomitant skew between data bits. Data-buffer components 110 provide load isolation for read, write, and strobe signals to and from components 105, and each receives a communication signal COM and select signal SEL—steering signals DS—that together direct the steering of data between DRAM component 105 and module connector 112.

In the wide mode, the operation of module 100 is consistent with that of LRDIMM server components that employ DDR4 memory. Briefly, address-buffer component 115 registers and re-drives signals from the memory controller to access DRAM components 105. Address-buffer component 115 selectively interprets and retransmits commands (e.g., in a manner consistent with the DDR4 Specification) to DRAM components 105 via secondary command, address, and control interfaces 120A and 120B. The signals for secondary interfaces 120A and 120B are specific to the installed memory dies, and the timing, format, and other parameters of those signals are specified for commercially available dies in a manner well understood by those of skill in the art.

A mode register 130 in data-buffer component 110 can be loaded by logic 125 during system initialization to determine whether data-buffer component 110 operates in the wide mode (Mode=0) or the narrow mode (Mode=1). The different modes alter the data width of data-buffer component 110 by allowing external access to either two DRAM components 105 in parallel via two data ports DQu and DQv (wide mode) or one of two DRAM component 105 at a time via one of data ports DQu and DQv (narrow mode).

Each nibble-wide primary data port DQu and DQv is accompanied by two lines that convey a respective one of complementary strobe signals DQSup± and DQSvp±. Data-buffer component 110 conveys four bits of data DQ[3:0] and a corresponding strobe signal DQS[0]± to one of the associated DRAM components 105 and another four bits of data DQ[7:4] and a corresponding strobe signal DQS[1]± to the other. The two strobe lines associated with each data port are to convey timing references for data communication, and are not included in expressed data widths.

Data-buffer component 110 is illustrated along the bottom of FIG. 1B with each of three possible connections; a first connection 135 used in wide (×8) and narrow (×4) modes, a second connection 140 used only in the narrow mode, and a third connection 145 used only in the wide mode. In other embodiments, register 130 is located elsewhere (e.g., in address-buffer component 115), or separate registers can be included for each component.

In the wide mode, logic 125 issues a command via interface COM to set the contents of data-buffer register 130 to zero during system initialization. Connections 135 and 145 together convey byte-wide data DQu/DQv between a selected pair of DRAM components 105 and module connector 112, irrespective of the value of select signal SEL from logic 125. Logic 125 derives secondary signals CNTLA and CAA on secondary interface 120A and signals CNTLB and CAB on secondary interface 120B from primary signals DCA and DCNTL to read and write byte-wide data from and to both components 105 associated with data-buffer component 110.

In the narrow mode, logic 125 causes data-buffer component 110 to load a logic one into mode register 130. Logic 125 then directs information received on primary control interface DCNTL to one of two secondary chip-select interfaces QACS and QBCS to enable either the upper or lower subset of components 105. Logic 125 additionally decodes an address bit Add to selectively assert select signal SEL to data-buffer component 110. If signal SEL is a logic zero (one), data-buffer component 110 directs nibble-wide data to and from the component 105 connected to secondary interface 120B (120A). The ability to select between DRAM components connected to the two interfaces 120A and 120B doubles the number of addressable storage locations on module 100. These locations are half the width of the locations in the wide mode, however, so both modes provide the same amount of data storage.

Data-buffer component 110 communicates either via the low-order nibble (port DQu) in the narrow mode or both the low- and high-order nibbles (ports DQu and DQv) in the wide mode. In other embodiments data-buffer component 110 can communicate via either the low- or the high-order nibbles, and address-buffer component 115 might also be modified to convey configuration signals for establishing the mode or modes. This option to select either the high-order or low-order nibbles provides board-level routing flexibility.

Figure 2A:
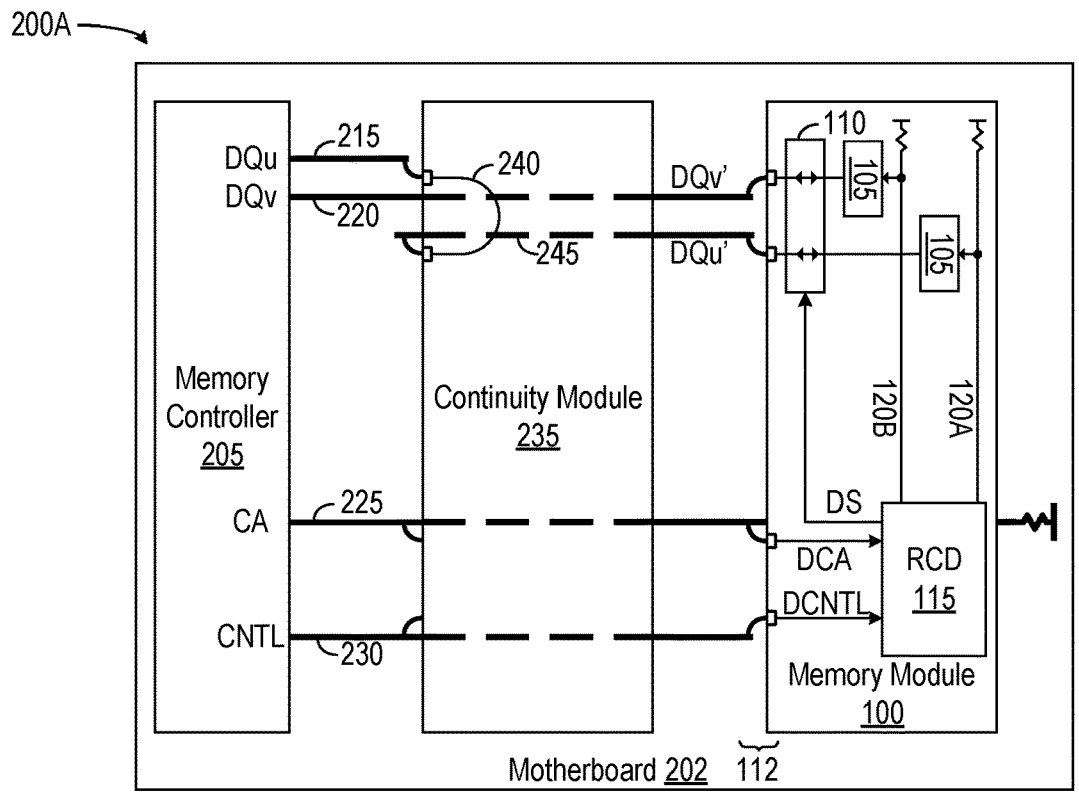
FIG. 2A depicts a memory system 200A in which a motherboard 202 supports a memory-controller component 205 that communicates with one instance of memory module 100 of FIGS. 1A and 1B via data link groups 215 and 220, a command-and-address (CA) link 225, and a control (CNTL) link 230.

FIG. 2A depicts a memory system 200A in which a motherboard 202 supports a memory-controller component 205 that communicates with one instance of memory module 100 of FIGS. 1A and 1B via data link groups 215 and 220, a command-and-address (CA) link 225, and a control (CNTL) link 230. Motherboard 202 includes two memory-module sockets, one of which includes module 100 and the other a continuity module 235. Continuity module 235 includes electrical traces 240 that interconnect link groups 215 from controller component 205 with motherboard traces 245 that extend between the two similar memory-module sockets. (Alternative names for motherboard 202 include mainboard, system board, or logic board.)

Controller component 205 advantageously communicates with memory module 100 via point-to-point connections. As detailed below in connection with FIG. 2B, motherboard 202 and memory module 100 likewise support point-to-point data connections in a two-module configuration. In this full-width example, module 100 behaves as a legacy DDR4 LRDIMM, and can communicate with controller 205 as conventional memory module in the wide mode. Motherboard 202 is also backward compatible with readily available memory modules, and can employ a conventional, wide module in place of module 100.

Controller component 205 communicates command and address signals CA and control signals CNTL to initiate memory transactions (e.g., read and write transactions) with module 100. (In general, signals and their associated nodes carry the same designations. Whether a given moniker refers to a signal or a corresponding node will be clear from the context.) Address-buffer component 115 selectively interprets and retransmits these commands, addresses, and (control) signals as needed to respond to the controller's requests, facilitating data movement between DRAM components 105 and module connector 112 via data-buffer component 110. Point-to-point data connections facilitate fast and efficient signaling between a memory controller (not shown) and memory module 100. Memory transactions and point-to-point signaling are familiar to those of skill in the art; a detailed discussion is therefore omitted for brevity.

Data-buffer component 110 includes two primary data interfaces, coupled to respective link groups 215 and 220 to communicate respective data signals DQu' and DQv', and two secondary data interfaces, one to each of the two DRAM components 105. Module 100 is in a wide mode in this example, in which case address-buffer component 115 causes data-buffer component 110 to provide buffered data paths between two active DRAM components 105 and respective link groups 215 and 220.

Figure 2B:
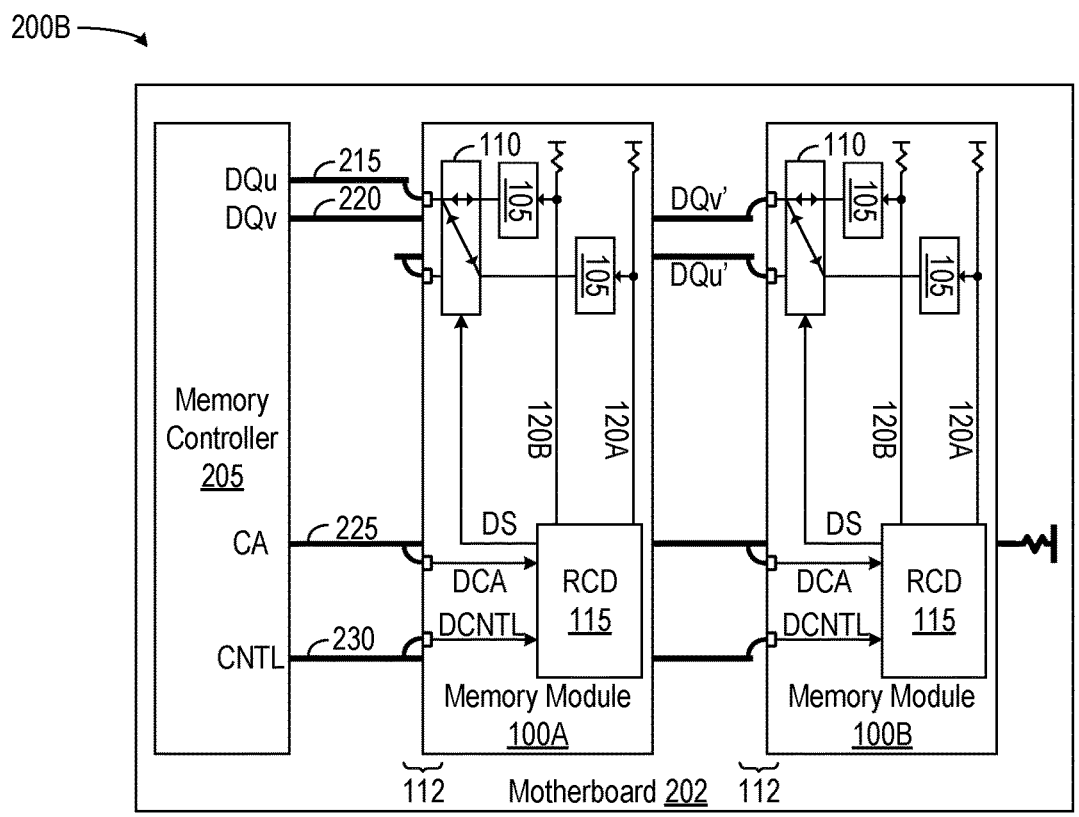
FIG. 2B depicts a memory system 200B in which the same motherboard 202 of FIG. 2A is populated with two memory modules 100A and 100B, each in the narrow mode.

FIG. 2B depicts a memory system 200B in which the same motherboard 202 of FIG. 2A is populated with two memory modules 100A and 100B, each in the narrow mode. Due to the motherboard connectivity, each module is connected to controller component 105 via only one of link groups 215 and 220. Modules 100A and 100B thus exhibit a lower load on the data link groups than in systems in which two modules share the same data links. Both modules 100A and 100B respond to controller 205 for each memory transaction to deliver full-width data.

In the narrow mode, address-buffer component 115 issues a data-steering signal DS on a like-identified interface that causes data-buffer component 110 to route all accesses to and from DRAM components 105 through the same primary data interface; the remaining primary data interface is not used. Rather than selecting both DRAM components 105 for one memory transaction, as in the wide mode of FIG. 2A, the address-buffer component 115 on each of modules 100A and 100B selects only one DRAM component 105 for each transaction and routes data to or from the selected DRAM component via data-buffer component 110. Address-buffer components 115 control their respective steering signals DS and secondary chip-select signals on interfaces 120A and 120B by decoding primary control signals DCNTL, primary address signals DCA, or both. Address-buffer components 115 and data-buffer components 110 support the different operational modes so that DRAM components 105 can be standard, readily available memory components.

In FIGS. 2A and 2B it is assumed that DQ link groups 215 and 220 operate at or near a maximum practical signaling rate to maximize the data bandwidth between controller 205 and the module or modules 100. For both module configurations, the point-to-point connections support these relatively high data rates. The command and control link groups 225 and 230 are point-to-two-point connections that operate at a lower rate.

Figure 3A:
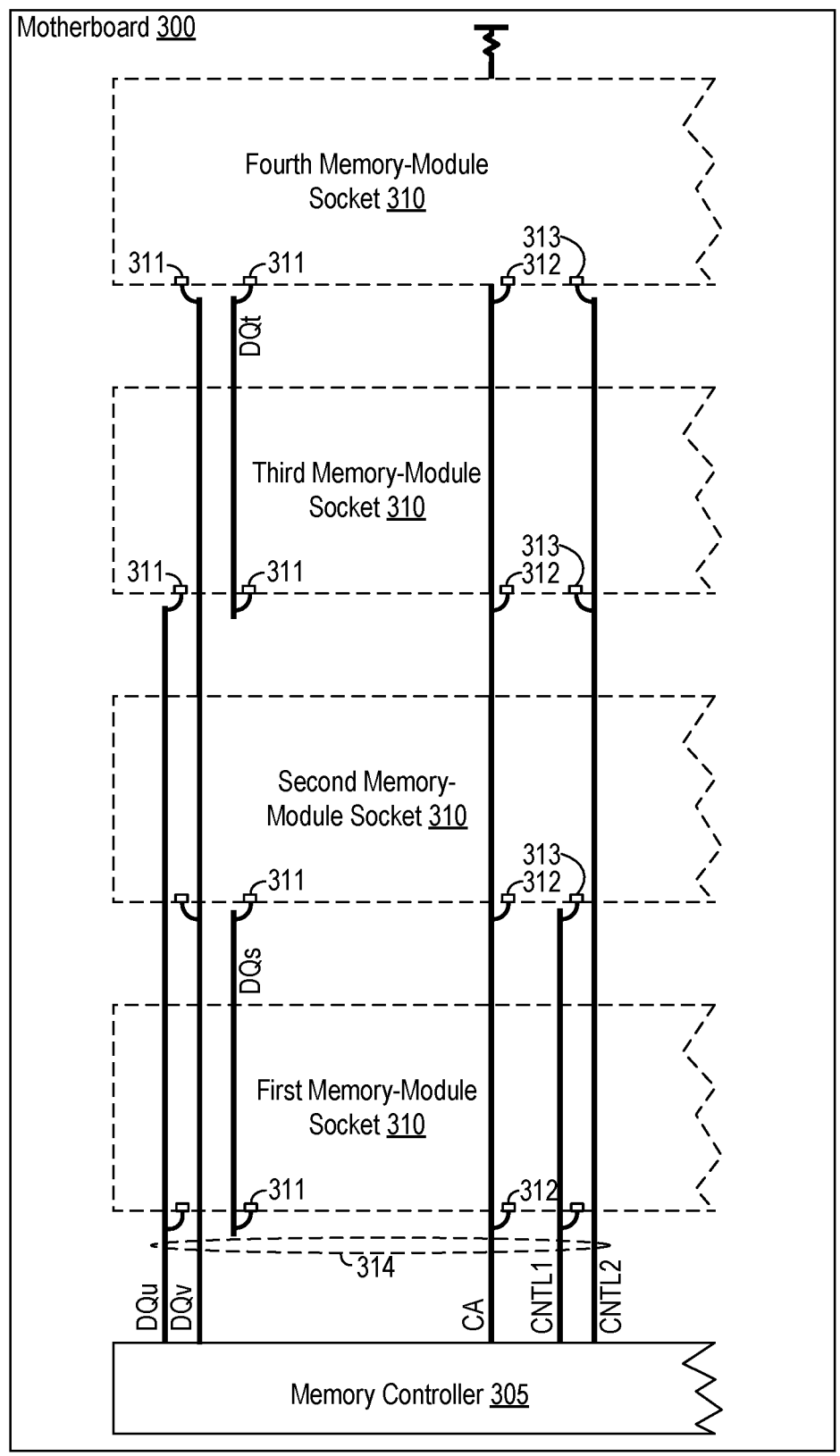
FIG. 3A depicts a motherboard 300 in accordance with an embodiment in which a single memory channel connects to from one to four memory modules, with each DQ link group connecting to at most two modules.

FIG. 3A depicts a motherboard 300 in accordance with an embodiment in which a single memory channel connects to from one to four memory modules, with each DQ link group connecting to at most two modules.

Motherboard 300 includes a memory controller 305 and first, second, third, and fourth memory-module sockets 310, or "connectors." Sockets 310 have similar collections of pin groups that provide physical connectivity to installed memory or connectivity modules. The number of pin groups on each socket, reduced here for ease of illustration, includes data pin groups 311, a command pin group 312, and a control pin group 313.

Motherboard 300 connects controller 305 to each socket 310 via data (DQ) link groups DQu, DQv, DQs, and DQt; a command-and-address (CA) link group CA, and two control (CNTL) link groups CNTL1 and CNTL2. These signals and their respective conductors are collectively part of one memory "channel" 314. Each DQ link group has four DQ data links and one complementary timing link (strobe DQSp±), for a total of six wired connections. A full memory channel includes additional pairs of similar DQ link groups and can convey additional signal, and motherboard 300 may include additional channels for controller 305, but these resources are omitted here for ease of illustration.

Link group DQu connects controller 305 to corresponding pin groups 311 on the first and third module sockets 310, and link group DQv extends from controller 305 to the second and fourth module sockets 310. Link groups DQs and DQt are not connected to controller 305; rather, link group DQs extends between pin groups 311 on the first and second sockets 310 and link group DQt between the third and fourth. Socket connections are denoted by curved segments between the link groups and sockets.

Link group CA extends to all four sockets 310, and includes twenty-six links: eighteen address (A), two bank address (BA), two bank group (BG), one activate (ACT), one parity (PAR), and a complementary clock link (CLK±). Control link group CNTL1 extends to the first and second module sockets 310, and link group CNTL2 to the third and fourth. Each of link groups CNTL1 and CNTL2 includes nine links, including five chip-select (CS) links, two on-die-termination (ODT) links, and two clock-enable links (CKE). The CA and CNTL links operate at one quarter or one half the signaling rate of the DQ link groups, and can be terminated with resistive devices that are matched to the characteristic impedance of each link. The resistive devices can be passive resistors on motherboard 300 or on a module, or can be active ODT devices that are fabricated in the interface circuitry of integrated-circuit components on the modules or elsewhere.

Figure 3B:
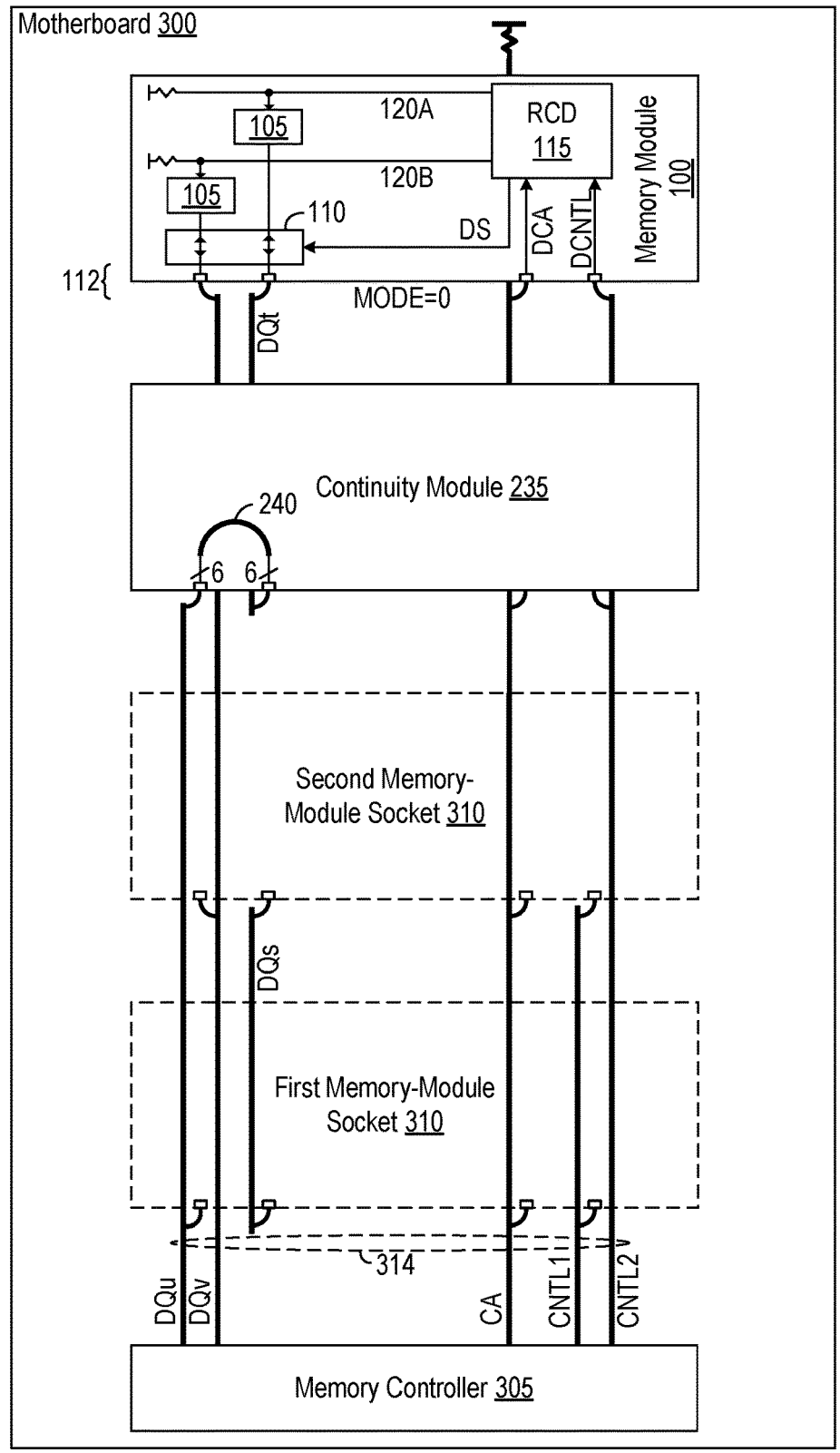
FIG. 3B depicts a memory system 315 with a single memory module 100 installed in one of the memory-module sockets 310 of motherboard 300 of FIG. 3A.

FIG. 3B depicts a memory system 315 with a single memory module 100 installed in one of the memory-module sockets 310 of motherboard 300 of FIG. 3A. Module 100 is configured at initialization to enter the wide mode (Mode=0). Configuration may be accomplished by setting a configuration field in mode register 130 (FIG. 1B), but can also be done using e.g. a configuration pin. The mode register can be loaded by a slow signal interface (an SPD bus, an I2C bus, or something similar), or it can be loaded by a high-speed bus (the CA, CNTL, or DQ link groups).

Memory controller 305 connects directly to module connector 112 of module 100 via data link group DQv. Traces 240 of a continuity module 235 connect link groups DQu and DQt in series to establish a second set of data connections between controller 305 and module connector 112. (Link groups DQu and DQt include four data traces, but traces 240 include six to convey the associated complementary strobe signals introduced in FIG. 1B.) Command-and-address link group CA and control link group CNTL2 connect directly to the fourth socket, and thus to installed module 100. Controller 305 is thus able to communicate byte-wide data with data-buffer component 110, and nine-byte (72-bit) data with the entire module 100. Motherboard 300 is compatible with legacy LRDIMM modules, which can be used in place of module 100 to provide byte-wide data via each DQu/DQv link-group pair.

Figure 3C:
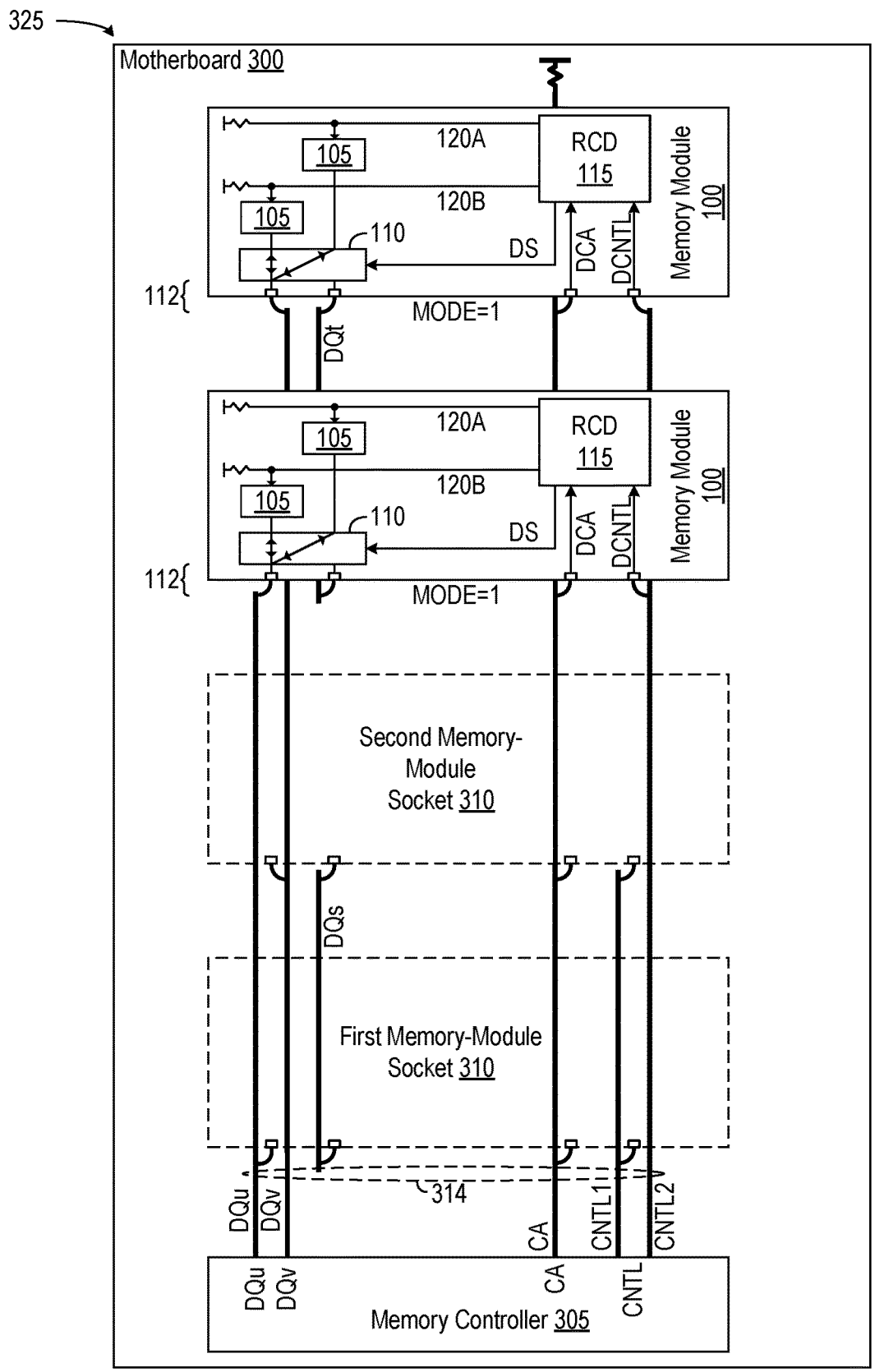
FIG. 3C depicts a memory system 325 with two memory modules 100 installed, one in each of the third and fourth sockets 310 of motherboard 300.

FIG. 3C depicts a memory system 325 with two memory modules 100 installed, one in each of the third and fourth sockets 310 of motherboard 300. Each module 100 is statically configured at initialization to enter the narrow mode (Mode=1). Memory controller 305 connects directly to module connector 112 of the nearest module 100 via data link group DQu, and to module connector 112 of the far module 100 via data link group DQv. Link groups CA and CNTL each connects to both modules 100. Controller 305 is thus able to communicate nibble-wide data with each module 100 concurrently, for combined byte-wide data via each DQu/DQv link-group pair. From the perspective of controller 305, the two half-width modules 100 present a full complement of point-to-point data connections with twice the memory capacity of a single full-width module 100.

Memory controller 305 is assumed to be compatible with legacy memory systems in this example. Changes to system BIOS (basic input/output system) firmware may be required to configure modules 100 during system initialization to distinguish between the narrow and wide modes.

Figure 3D:
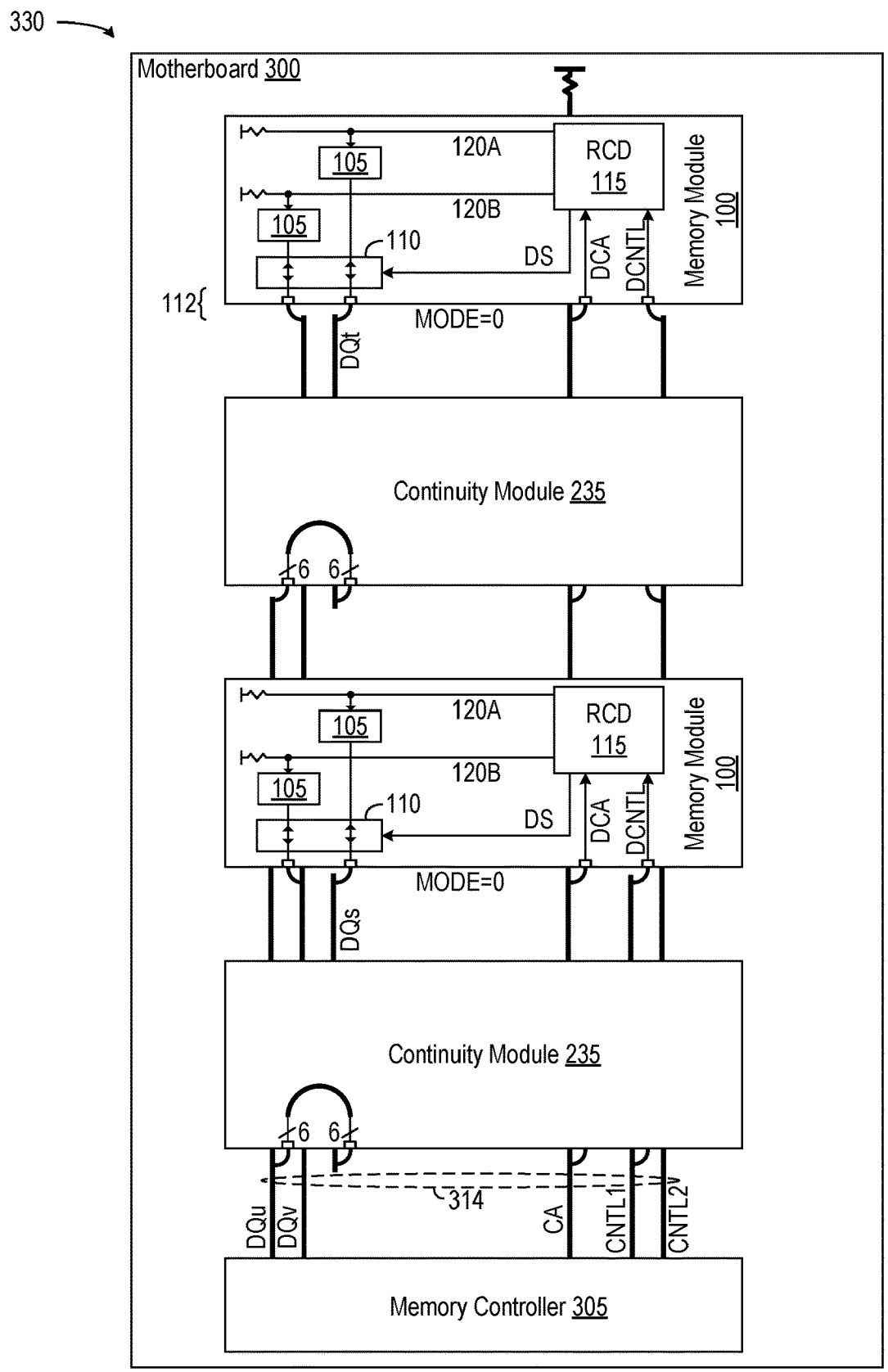
FIG. 3D depicts a memory system 330 with two memory modules 100 installed, one in each of the second and fourth sockets 310 of motherboard 300.

FIG. 3D depicts a memory system 330 with two memory modules 100 installed, one in each of the second and fourth sockets 310 of motherboard 300. Each module 100 is statically configured at initialization to enter the wide mode (Mode=0). Alternatively, one or both modules 100 can be a legacy LRDIMM module. In either case, link group DQu connects memory controller 305 to the far memory module 100 via DQ link group DQt and a continuity module 235, and to the near memory module 100 via DQ link group DQs and a second continuity module 235; and link group DQv connects memory controller 305 directly to both memory modules. In effect, both memory modules 100 are connected to a common, byte-wide DQ bus. Command and address link group CA connects to both modules, and control link groups CNTL1 and CNTL2 connect controller 305 to the near and far modules 200, respectively.

Figure 3E:
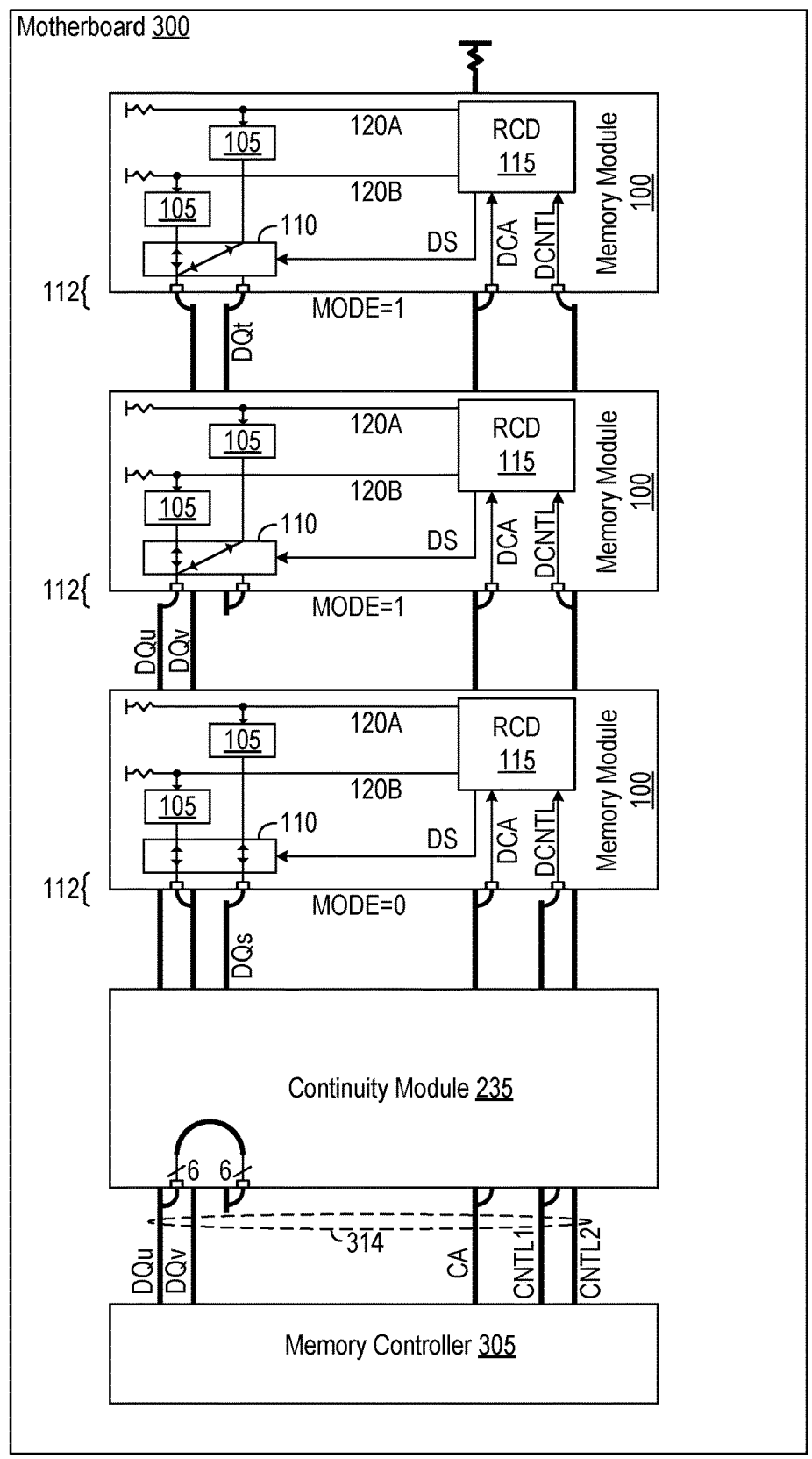
FIG. 3E depicts a memory system 335 with a continuity module 235 installed in the nearest socket and three memory modules 100 installed in the remaining three.

FIG. 3E depicts a memory system 335 with a continuity module 235 installed in the nearest socket and three memory modules 100 installed in the remaining three. The module 100 nearest controller 305 is configured at initialization to enter the wide mode (Mode=0); the remaining two modules 100 are configured in the narrow mode (Mode=1). The two topmost, narrow modules 100 are paired together to collectively communicate byte-wide data via each of the nine DQu/DQv link-group pairs. A continuity module 235 provides signals DQu to the wide module. From the perspective of controller 305, the three modules 100 appear as two full-width modules connected to the same channel 314.

Figure 3F:
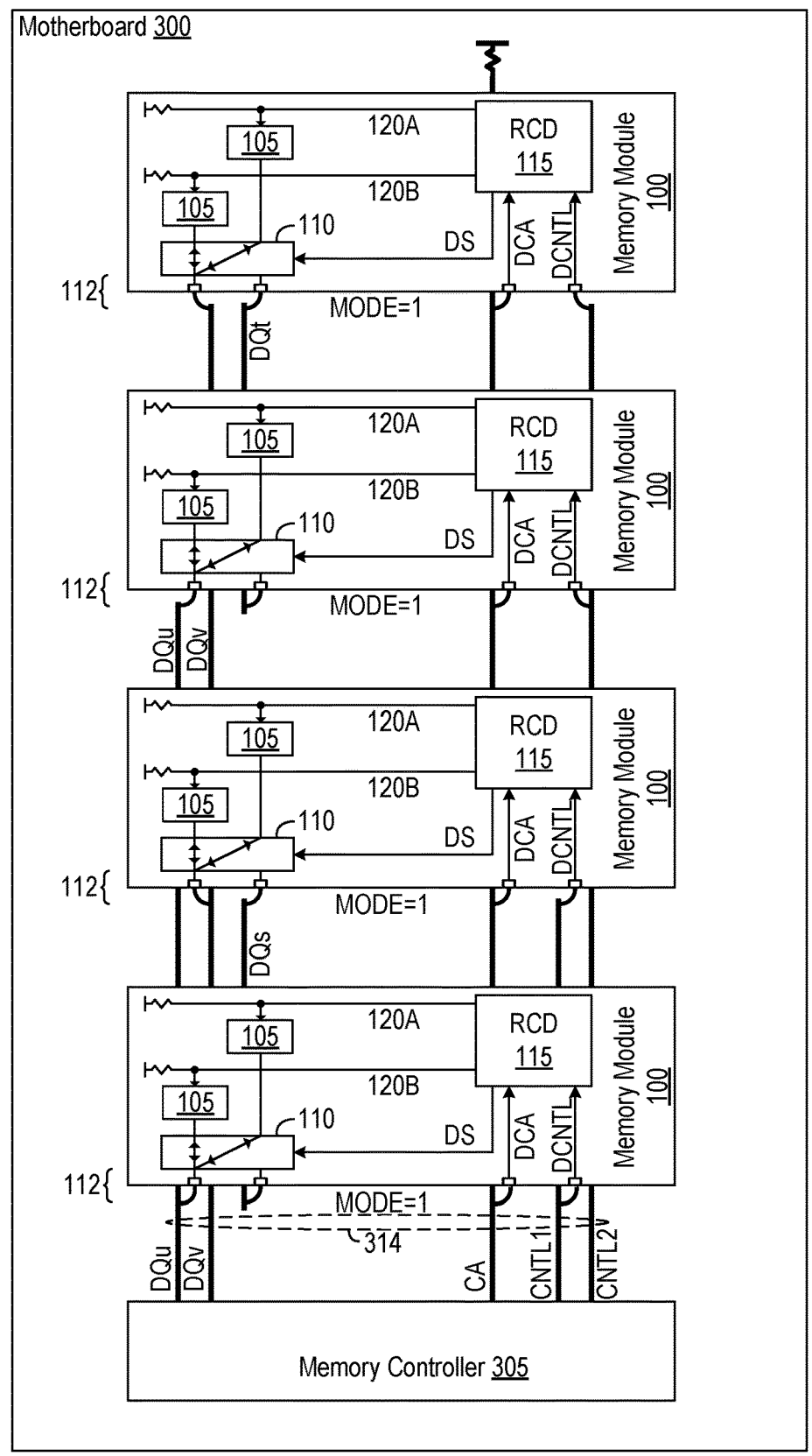
FIG. 3F depicts a memory system 340 with four installed memory modules 100, each of which is configured at initialization to the narrow mode (Mode=1).

FIG. 3F depicts a memory system 340 with four installed memory modules 100, each of which is configured at initialization to the narrow mode (Mode=1). The two topmost modules 200 are paired together to collectively communicate byte-wide data, as are the two bottommost modules. Each pair of modules exhibits a lower load on the data link groups than system in which four modules share the same data links.

Figure 3G:
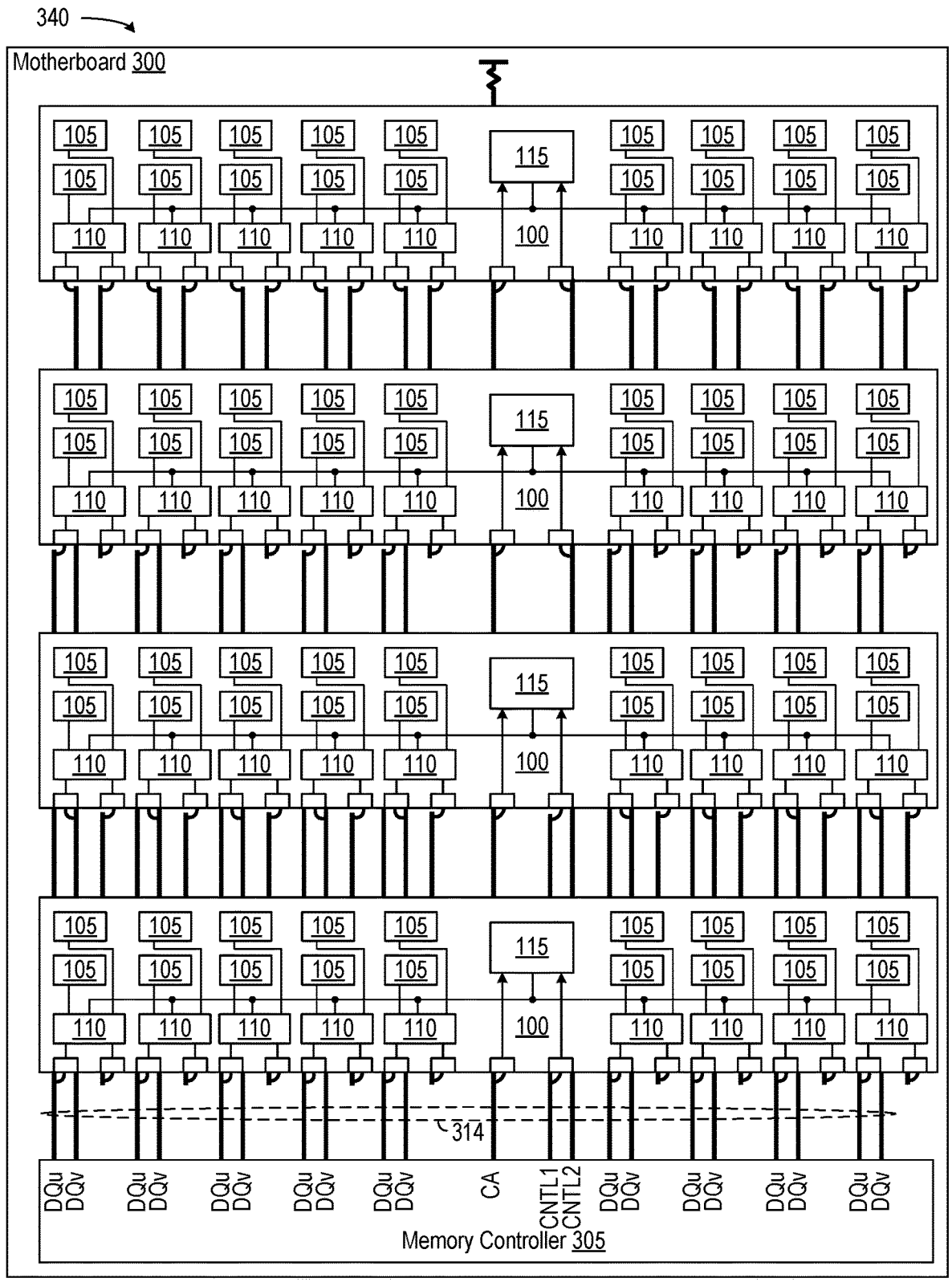
FIG. 3G depicts memory system 340 of FIG. 3F omitting some details in favor of showing all nine data-link groups DQu/DQv that extend from controller 305.

FIG. 3G depicts memory system 340 of FIG. 3F omitting some details in favor of showing all nine data-link groups DQu/DQv that extend from controller 305. This collection of conductors represents the full width of memory channel 314. Motherboard 300 and memory controller 305 may include more channels in support of more memory modules 100, legacy memory modules, or both.

Figure 3H:
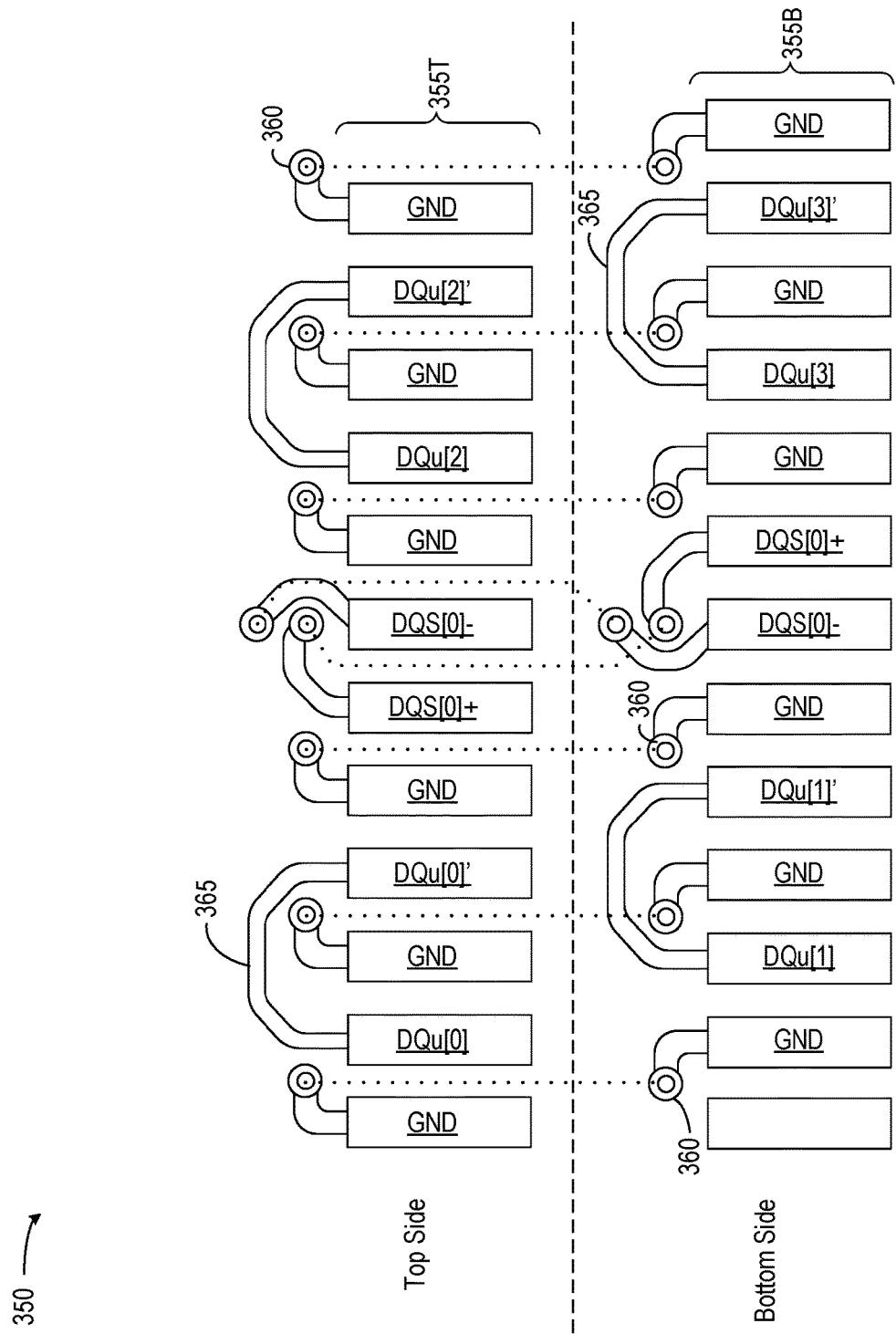
FIG. 3H depicts a continuity module 350 that can be used for e.g. module 235 of FIG. 2A.

FIG. 3H depicts a continuity module 350 that can be used for e.g. module 235 of FIG. 2A. Continuity module 350 is a two-sided PC board, with the top side including a row of contact pads 355T that physically engage corresponding links via a module socket. A similar row of contact pads 355B extend along the bottom side. Vias 360 extend through module 350 to electrically interconnect corresponding ones of pads 355T and 355B (dotted lines extend between interconnected vias 360 to identify through-board connectivity).

Each contact pad 355T/355B is labeled to indicate the signal it communicates. For example, one pad 355T is coupled to the link that conveys signal DQu[0]. Electrical traces 365 interconnect some of the pads to provide the connectivity depicted e.g. in FIG. 2A. Pads on either side of module 350 convey complementary strobe signals DQS[0]+ and DQS[0]−. Pads connected to ground potential (GND) are disposed between signal lines to reduce cross-coupled noise. Only one collection of interconnection resources is shown, but module 350 includes e.g. nine similar collections of interconnection resources.

Figure 4:
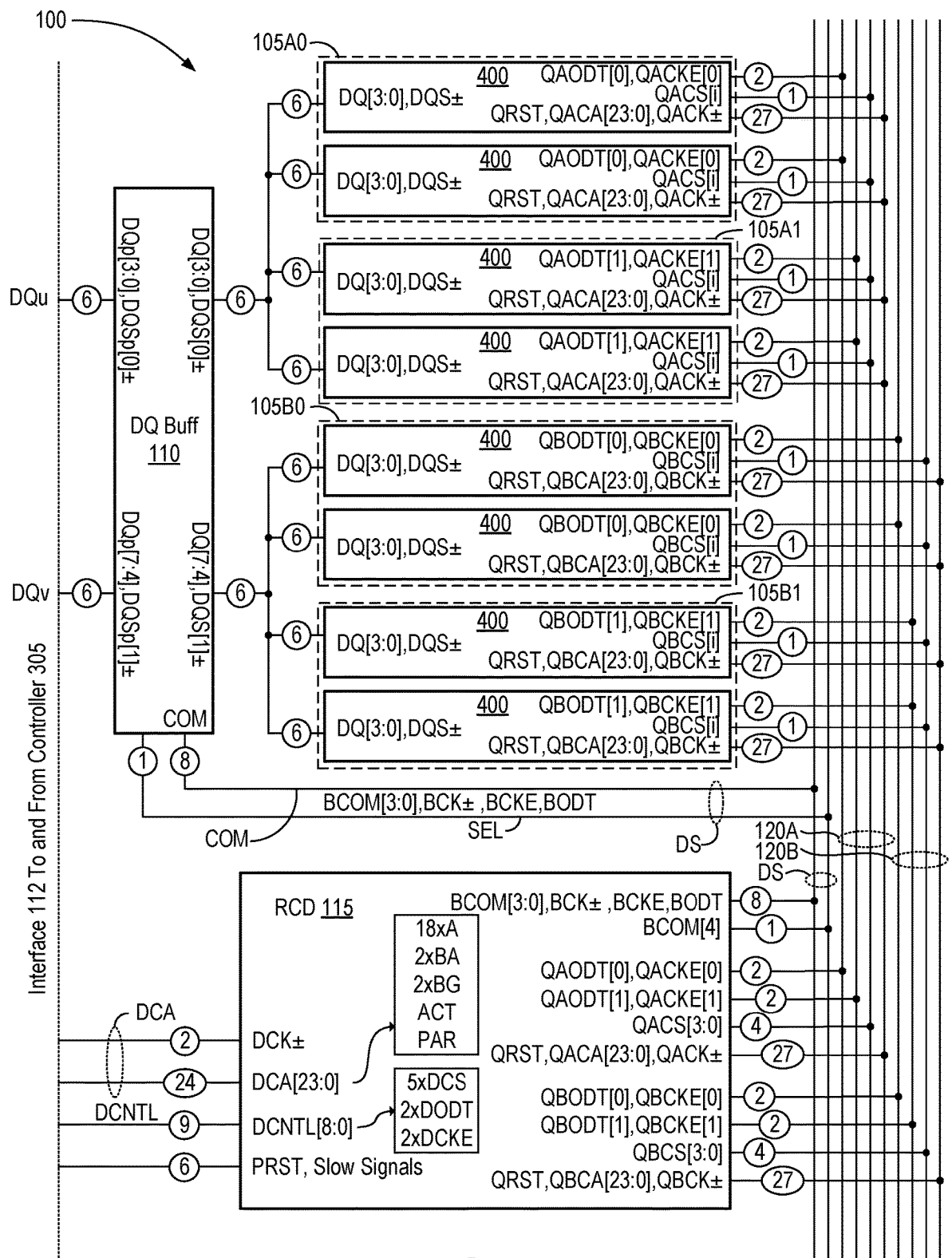
FIG. 4 details a portion of memory module 100, introduced in FIGS. 1A and 1B, highlighting features and connectivity that support width configurability in accordance with one embodiment.

FIG. 4 details a portion of memory module 100, introduced in FIGS. 1A and 1B, highlighting features and connectivity that support width configurability in accordance with one embodiment. Address-buffer component 115 is shown with one of the nine data-buffer components 110 and four DRAM components 105 with which data-buffer component 110 communicates. Each DRAM component 105 includes a pair of DRAM dies 400, and four components 105 associated with one data-buffer component 110 are distinguished using a two-place alphanumeric designation (A0, A1, B0, and B1). Secondary interfaces 120A, 120B, and DS—called "secondary" to distinguish them from primary interfaces to controller 305—each include multiple conductors with associated signals, to be discussed below. In this example, module 100 comprises a PC board with components on the same side, but components can be distributed across both sides.

Data-buffer component 110 includes two "nibble" data ports DQp[3:0], DQSp[0]± and DQp[7:4], DQSp[1]± on the controller side (or "processor" side), where "DQSp[#]±" specifies complementary strobes; and includes similar data ports DQ[3:0], DQS[0]± and DQ[7:4], DQS[1]± on the DRAM-component side. Select signal SEL directs data-buffer component 110 to steer data in the narrow mode, and commands issued on lines BCOM[3:0] of communication interface COM direct data and configure data-buffer component 110 in support of width configurability. Signal BCK± is a complementary clock signal, BCKE is a clock-enable signal that allows data-buffer component 110 to e.g. selectively power its interface circuits for improved efficiency, and signal BODT controls on-die-termination elements in data-buffer component 110 for impedance matching. These signals are generally well documented and understood by those of skill in the art, with a few modifications detailed below.

Each DRAM component 105 communicates with data-buffer component 110 via a data-and-strobe port DQ[3:0], DQS±. Address-buffer component 115 issues instruction to DRAM components 105A0/1 via secondary interface 120A, and to DRAM components 105B0/1 via secondary interface 120B. This communication takes place by way of ports QA/BODT[#], QA/BCKE[#], QA/BCS[i]; and QRST,QA/BCA[23:0],QA/BCK±.

Components 105 can be conventional, with well-documented and understood signaling and ports. Briefly, signals QA/BODT[#] control the on-die termination values for each DRAM component 105; signals QA/BCKE[#] (the "CKE" for "clock-enable"), are used to switch components 105 between active and low-power states; QA/BCS[i] are chip-select signals that determine which of components 105, if any, is active for a given memory transaction; QRST is a reset signal common to all components 105; QA/BCA[23:0] are command and address ports; and QA/BCK± receive a complementary clock signal that serves as a timing reference.

At the left in address-buffer component 115, the primary links (from controller 305) are labeled DCK±, DCNTL[8:0], and DCA[23:0]. In this configuration, control links DCNTL [3:0] carry the decoded chip-select information for four ranks; link DCNTL[4] is not used. (In this context, a "rank" is a set of memory dies the controller accesses simultaneously to read and write data.) The "slow signals" that are connected to the address buffer are used for initialization and maintenance operations.

Address-buffer component 115, or RCD, presents a single electrical load to command, address, control, and clock signals from controller 305. In addition to buffering, address-buffer component 115 copies commands and addresses on primary links DCA[23:0] to secondary links QACA[23:0] and QBCA[23:0] of respective secondary interfaces 120A and 120B; copies chip-select information on the primary links DCNTL[3:0] to only one of link groups QACS[3:0] or QBCS[3:0] of secondary interfaces 120A and 120B; and forwards buffered clock signals BCK±, QACK±, and QBCK±. The choice between link groups QACS[3:0] and QBCS[3:0] depends upon the value of address bit A[17] of signal DCA[23:0] in one embodiment, but other bits might be used for this sub-selection function (signals DCNTL[4] and BG[1] are other possibilities).

Components 105A0 contains two DRAM dies 400 connected to respective lines QACS[2,0] of secondary interface 120A, and component 105A1 contains two DRAM dies 400 connected to respective lines QACS[3,1]. Component 105B0 contains two DRAM dies 400 connected to respective lines QBCS[2,0] of secondary interface 120B and component 105B1 contains two DRAM dies 400 connected to respective lines QBCS[3,1]. Other embodiments support more or fewer dies per site, depending e.g. on the selected DRAM packaging option.

Address-buffer component 115 conveys memory sub-selection information to data-buffer components 110 via select signal SEL, also identified as BCOM[4]. This signal instructs each data-buffer component 110 to access components 105A[1:0] or 105B[1:0] respectively connected to the low (DQ[3:0]) or high (DQ[7:4]) secondary DQ link groups. Signals BCOM[3:0] are used to configure data-buffer component 110 to set the data width. Signals BCOM[4:0] can be used for other purposes, in addition to this selection function. For example, they could be used for other initialization operations, and for maintenance and testing.

Primary links DCNTL[8:0] pass signals DODT[1:0], which control the output device termination of components attached to a DQ link that are not performing a direct access. For a column-write operation, for example, one of signals QACS[3:0] on secondary interface 120A is asserted, and the QACA[23:0] secondary CA links carry the column write command and address information. One chip-selected DRAM die 400 will perform the write access in the narrow mode, or two in the wide mode. The write access enables the ODT termination in the DRAM die(s) being accessed. Address-buffer component 115 also provides signals DODT [1:0] of the primary CNTL link as secondary signals QAODT[1:0] and QBODT[1:0] to control the terminations of pairs of unselected DRAM dies 400 that share a data-buffer connection with a selected die 400. Read accesses are treated similarly, but address-buffer component 115 directs data from the selected die(s) 400 to the controller via data-buffer component 110.

For write or read access, the applied termination values will typically be different than the value used by the DRAM component 105 performing a write access because the termination is dampening reflections from the interconnection stub. In the narrow mode, a pair of dies 400 in the unselected component 105 has their terminations enabled. This is not required, however, as no data is to be transferred over the affected link, and does not affect performance.

Primary control links DCNTL[8:0] include two links (e.g., DCNTL[8:7]) that control the power state (clock enable) of DRAM components 105 that are not performing a direct access. For a column read operation to the lower die 400 of component 105A0, for example, address-buffer component 115 asserts signal QACS[2], and secondary links QACA[23:0] carry the column-read command and address information. In the narrow mode, the selected die alone performs the read access. In the wide mode, the lower die 400 in component 105B0, also connected to link QBCS[2], is likewise selected and participates in the read access.

Address-buffer component 115 includes a number of circuits that are omitted here. Such circuits may include a phase-locked loop, training and built-in self-test (BIST) logic, a command buffer, and a command decoder. These and other circuits are well understood by those of skill in the art, and details unrelated to the present disclosure are omitted for brevity.

Figure 5:
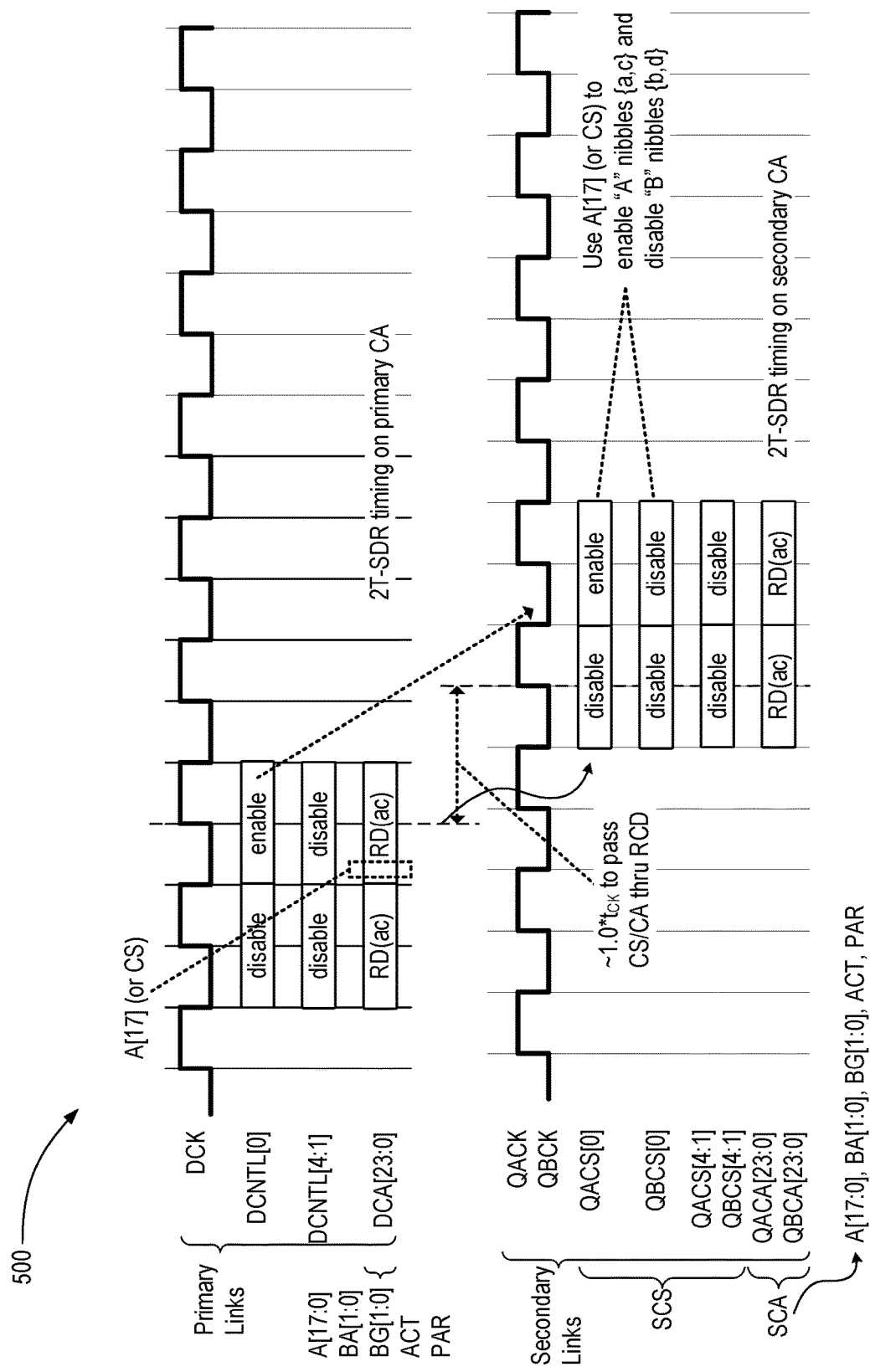
FIG. 5 is a timing diagram 500 illustrating a column read operation for the four-module memory system 340 FIG. 3F, with module details provided in FIG. 4.

FIG. 5 is a timing diagram 500 illustrating a column read operation for the four-module memory system 340 FIG. 3F, with module details provided in FIG. 4. The primary and secondary CA and CNTL links use 2T-SDR timing in this example, which means that each bit of information occupies a two-clock-cycle interval. Command and address signals are carried on the primary links DCA[23:0] (just "DCA" in FIG. 3F), and command and address information is driven for a two-clock-cycle interval.

In the case of an activation operation, the ACT link of DCA[23:0] is asserted, with a row address carried on the A[17:0] links of link group DCA[23:0]. In the case of a column read or write operation, the ACT link is de-asserted, and the column command and the column address are carried on the A[17:0] links. In either case, the bank-group address is carried on the BG[1:0] links of DCA[23:0], the bank address is carried on the BA[1:0] links, and the PAR link contains error-control information.

Address-buffer component 115 copies the command and address on primary links DCA[23:0] to secondary links QACA[23:0] and QBCA[23:0], which are part of secondary command interfaces 120A and 120B in e.g. FIG. 3F. The secondary command and address information is also driven for a two-clock-cycle interval. When module 100 operates in the narrow mode, one of the secondary command interfaces 120A and 120B can be left un-asserted to reduce power consumption.

In the example in FIG. 5 primary CS link DCNTL[0] link is asserted and links DCNTL[4:1] are not. The asserted link is enabled only in the second cycle of the two-clock-cycle interval it occupies. Address link A[17], used here for memory component sub-selection, is asserted. Address-buffer component 115 thus copies the chip select information from primary links DCNTL[4:0] links to secondary links QACS[4:0], leaving secondary links QBCS[4:0] un-asserted. (Had link A[17] not been asserted, address-buffer component 115 would have copied the chip-select information from primary links DCNTL[4:0] links to secondary links QBCS[4:0] and left secondary links QACS[4:0] un-asserted.)

When two narrow modules 100 are accessed concurrently, both modules receive the same CNTL link group and the same DCNTL[0] link is asserted. Both modules therefore perform the same column operation. However, the selected number of DRAM components 105 on each module 100 is halved. The assertion of primary DCNTL[0] link causes signal QACS[0] to be asserted; the secondary CS signal QBCS[0] is not asserted. These signals can be controlled by an unused link in the CA link group or CNTL link group. In this example, the A[17] link of the CA link group is used.

Figure 6A:
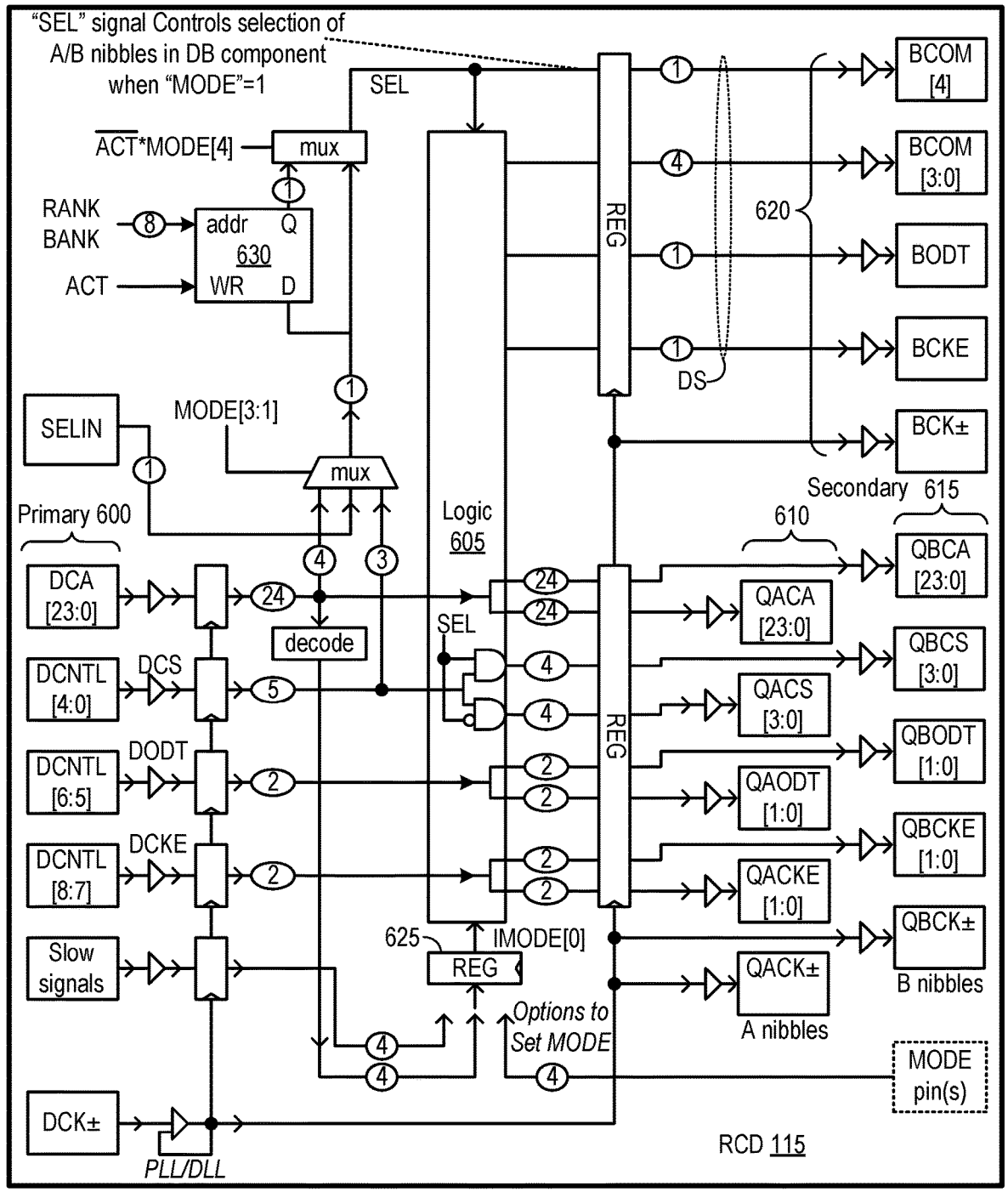
FIG. 6A details an embodiment of address-buffer component 115 of FIGS. 1A, 1B, and 4.

FIG. 6A details an embodiment of address-buffer component 115 of FIGS. 1A, 1B, and 4. A primary control interface 600 receives primary clock signal DCK±, control signals DCNTL[8:0], and command signals DCA[23:0]. Control signals DCNTL[8:0] include five chip select signal DCS, two on-die termination signals DODT, and two clock-enable signals DCKE. The "slow signals" that are connected to the address buffer are used for initialization and maintenance operations. Logic 605 selectively interprets and retransmits the primary signals as first secondary signals 610 and second secondary signals 615 on like-identified secondary control interfaces. Logic 605 also develops data-steering signals DS on a communication interface 620 that controls data-buffer components 110.

An internal mode signal IMODE[0] chooses between wide and narrow modes, as noted previously. In the wide mode, address-buffer component 115 copies command and address bits on primary links DCA[23:0] to secondary ports QACA[23:0] and QBCA[23:0], and copies chip-select information on primary links DCNTL[4:0] to secondary ports QACS[4:0] and QBCS[4:0]. In the narrow mode, select signal SEL controls which of secondary links QACS[4:0] and QBCS[4:0] are asserted. Address-buffer component 115 copies termination information on primary links DODT[1:0] to secondary links QAODT[1:0] and QBODT[1:0]. Component 115 also copies the clock-enable information on primary links DCKE[1:0] to secondary links QACKE[1:0] and QBCKE[1:0].

A dedicated pin SELIN can be added to drive select signal SEL. Signal SEL can also be driven from a number of DCA or DCNTL links that are not otherwise needed by memory module 100 to access the DRAM components. For example, signal SEL can be driven from a signal of the primary command and address link group DCA[23:0]. Address link A[17] is one possibility. Other links could be chosen using a static configuration value from an address-buffer register 625. For example, bank-group signal BG[1] could be used for SEL in embodiments with eight banks of DRAM dies. Select signal SEL can also be driven from a signal from the CS link group. Signal CS[4] is one possibility, and FIG. 6 shows how other CS links could be chosen using a static configuration value from register 625. Another alternative is the use of one of the above sources for the SEL value during an activation operation (ACT=1). This value can be written into a small memory array 630 using e.g. the Rank address (DCNTL[4:0]) and Bank address (BG[1:0]/BA[1;0]) as an index. This value is then read when a column read or write (ACT·0) is performed to the activated bank. This means that the controller does not need to keep track of the SEL value after the row has been activated.

Address bit A[13] could be used during column read or write operations, essentially doubling the size of an activated row; the activated row stretches across two different DRAM components in the module. This avoids the need of specifying SEL during an activation operation, at the cost of an increase in power.

Control register 625 is set statically at system initialization time. There are several possible options for setting this configuration value. These include: [1] a mode pin(s) on the module interface, [2] decoding a value received on the primary link groups DCA, DCNTL, or DQu/DQv, or [3] using a slow signal link (e.g. an SPD bus, an I2C bus, or something similar) to set a control register.

Figure 6B:
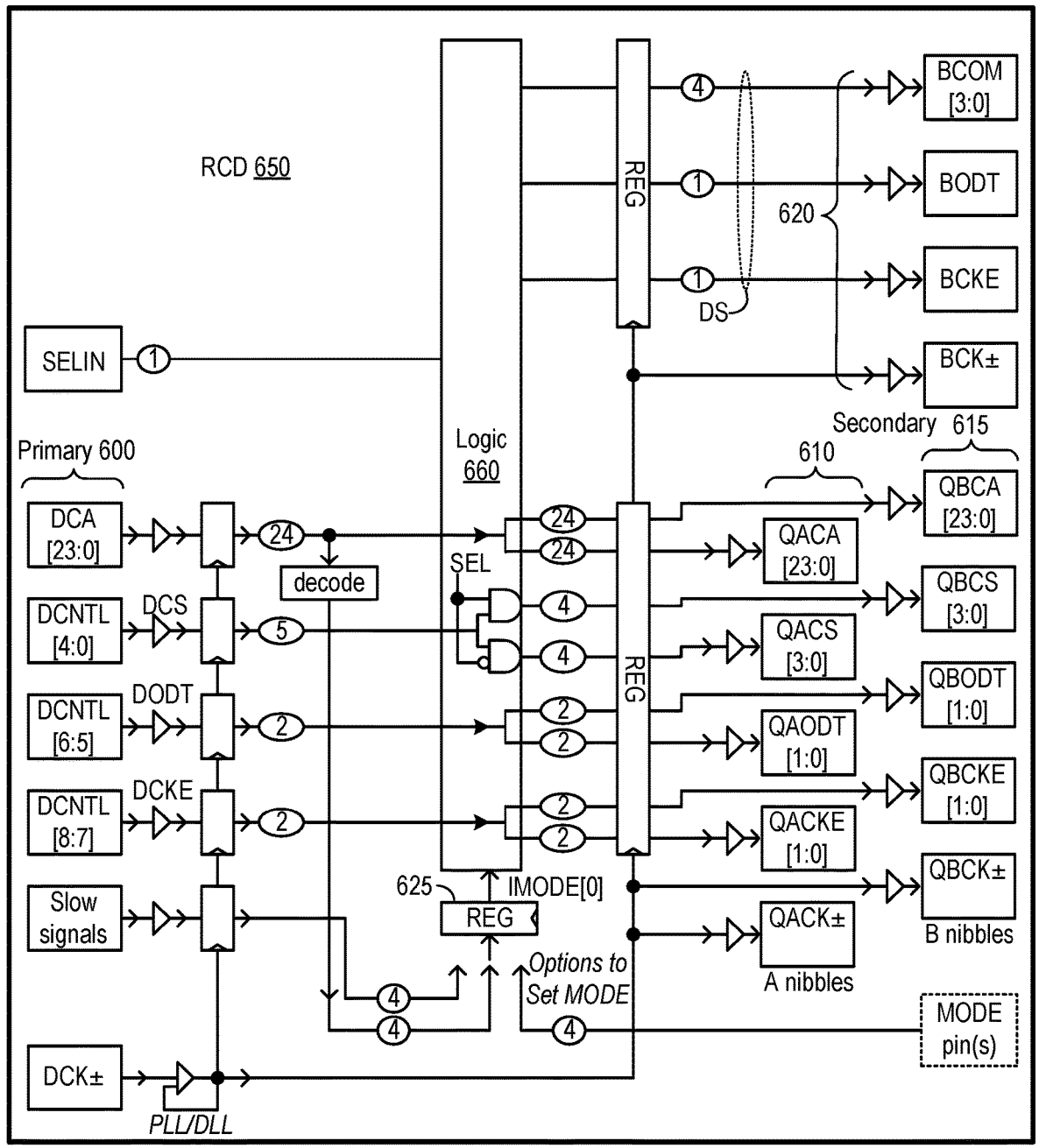
FIG. 6B details an address-buffer component 650 that can be used in lieu of address-buffer component 115 of FIGS. 1A, 1B, and 4.

FIG. 6B details an address-buffer component 650 that can be used in lieu of address-buffer component 115 of FIGS. 1A, 1B, and 4. Address-buffer component 650 is similar to address-buffer component 115 of FIG. 6A, so a detailed discussion is omitted. This example omits the select signal SEL that is conveyed as signal BCOM[4] in the embodiment of FIG. 6A. Instead, logic 660, which otherwise functions as does logic 605 of FIG. 6A, encodes a select instruction as a four-bit command over lines BCOM[3:0]. The communication links from the address-buffer component can have more or fewer lines in other embodiments.

Figure 7A:
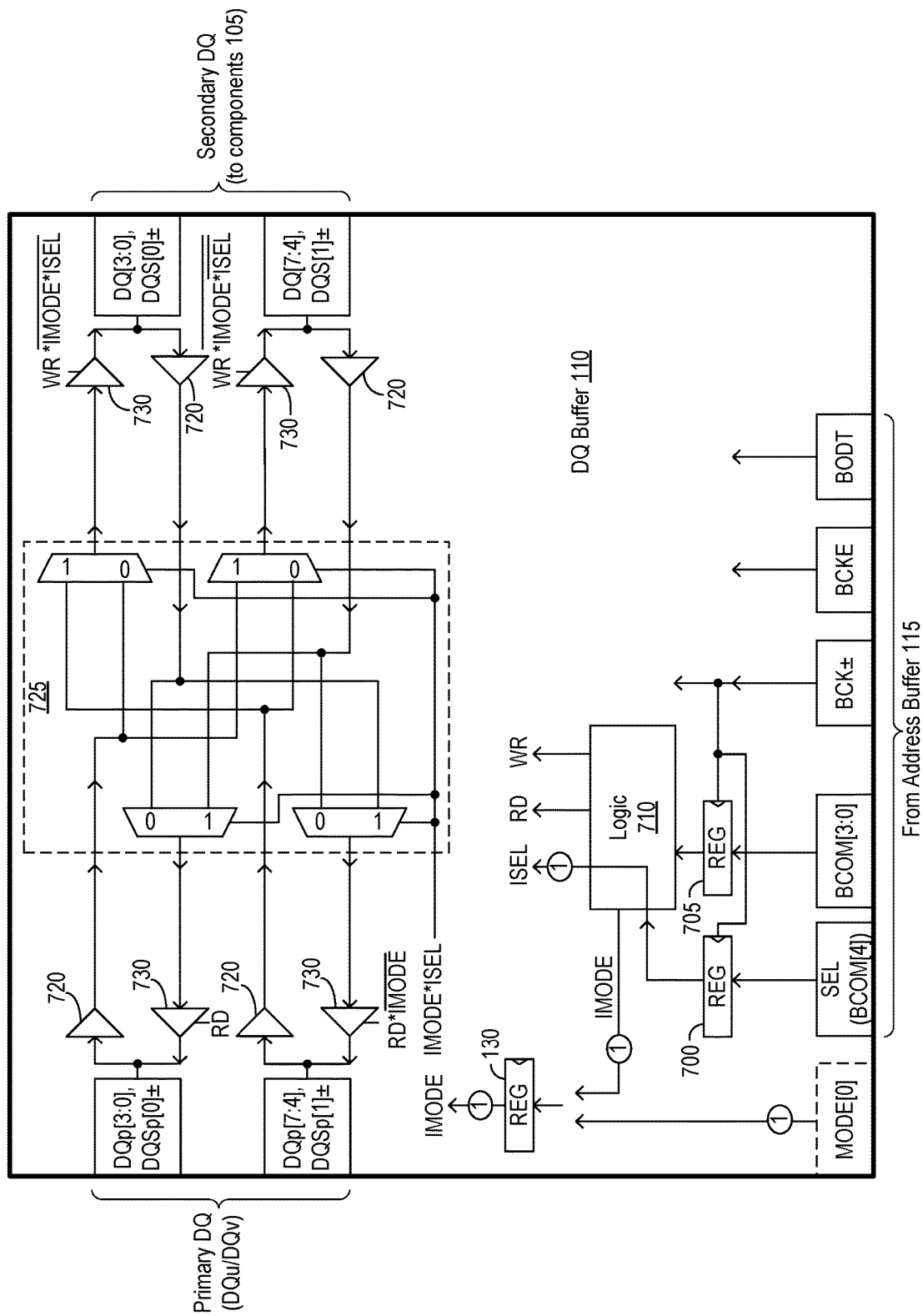
FIG. 7A depicts data-buffer component 110 in accordance with one embodiment.

FIG. 7A depicts data-buffer component 110 in accordance with one embodiment. The primary DQ interface, which connects to e.g. controller 305 via link groups DQu and DQv, includes two six-point connections: low-order data and strobe connections DQp[3:0] and DQSp[0]±, and high-order data and strobe connections DQp[7:4] and DQSp[1]±. The secondary DQ interface, which connects to DRAM components 105, likewise includes two six-point connections: low-order data and strobe connections DQ[3:0] and DQS[0]±, and high-order data and strobe connections DQ[7:4] and DQSp[1]±. The local interface to address-buffer component 115 receives communication signals BCOM[4:0], complementary clock signal BCK±, clock enable signal BCKE, and ODT control signal BODT. A pair of registers 700 and 705 captures communication signals BCOM[4:0] and presents them to logic 710, which derives therefrom an internal mode signal IMODE, an internal select signal ISEL, and read and write signals RD and WR. Mode signal IMODE is stored in mode register 130, which was introduced in connection with FIG. 1B. In another embodiment signal IMODE is not decoded from communication signals BCOM[4:0], but is provided from address-buffer component 115 or elsewhere via a separate connection.

Receivers 720 on the primary and secondary sides of data-buffer component 110 buffer and convey incoming data signals to steering logic 725. Logic 725 steers the received signals to selected transmitters 730 as directed by internal mode signal IMODE and internal select signal ISEL. Those signals, plus a read signal RD and write signal WR, selectively enable ones of transmitters 730 according to the logic expressed in the figure.

Logic 710 loads register 130 with either a one or a zero at the direction of address-buffer component 115. Setting signal IMODE to zero selects the wide mode and to one the narrow mode. In the wide mode, data-buffer component 110 transfers read and write data between the low-order data and strobe connections on the primary and secondary link groups (DQp[3:0]/DQSp[0]± to and from DQ[3:0]/DQS[0]±), and transfers data between the high-order data and strobe connections on the primary and secondary link groups (DQp[7:4]/DQSp[1]± to and from DQ[7:4]/DQS[1]±). These transfers occur in parallel.

In the narrow mode, data-buffer component 110 transfers read and write data between the low-order data and strobe connections on the primary and secondary link groups (DQp[3:0]/DQSp[0]± to and from DQ[3:0]/DQS[0]±), or transfers read and write data between the low-order data and strobe connections on the primary link groups and the corresponding high-order connections on the secondary link groups (DQp[3:0]/DQSp[0]± to and from DQ[7:4]/DQS[1]±). Internal select signal ISEL selects between these two transfer cases based on select signal SEL on line BCOM[4] from address-buffer component 115. Internal select signal ISEL can be developed differently in other embodiments, such as be decoding additional or a different bit or bits of signal BCOM[4:0].

Clock signal BCK±, enable signal BCKE, and termination-control signal BODT are well understood, and their operations are not altered between modes. The value of mode signal IMODE can be established in various ways, including via [1] an external pin, [2] decoding a value received on the BCOM[3:0] links, [3] a control register write during initialization, and [4] reading a value from a serial-presence detect (SPD) component and set the register bit. Other methods are possible.

Figure 7B:
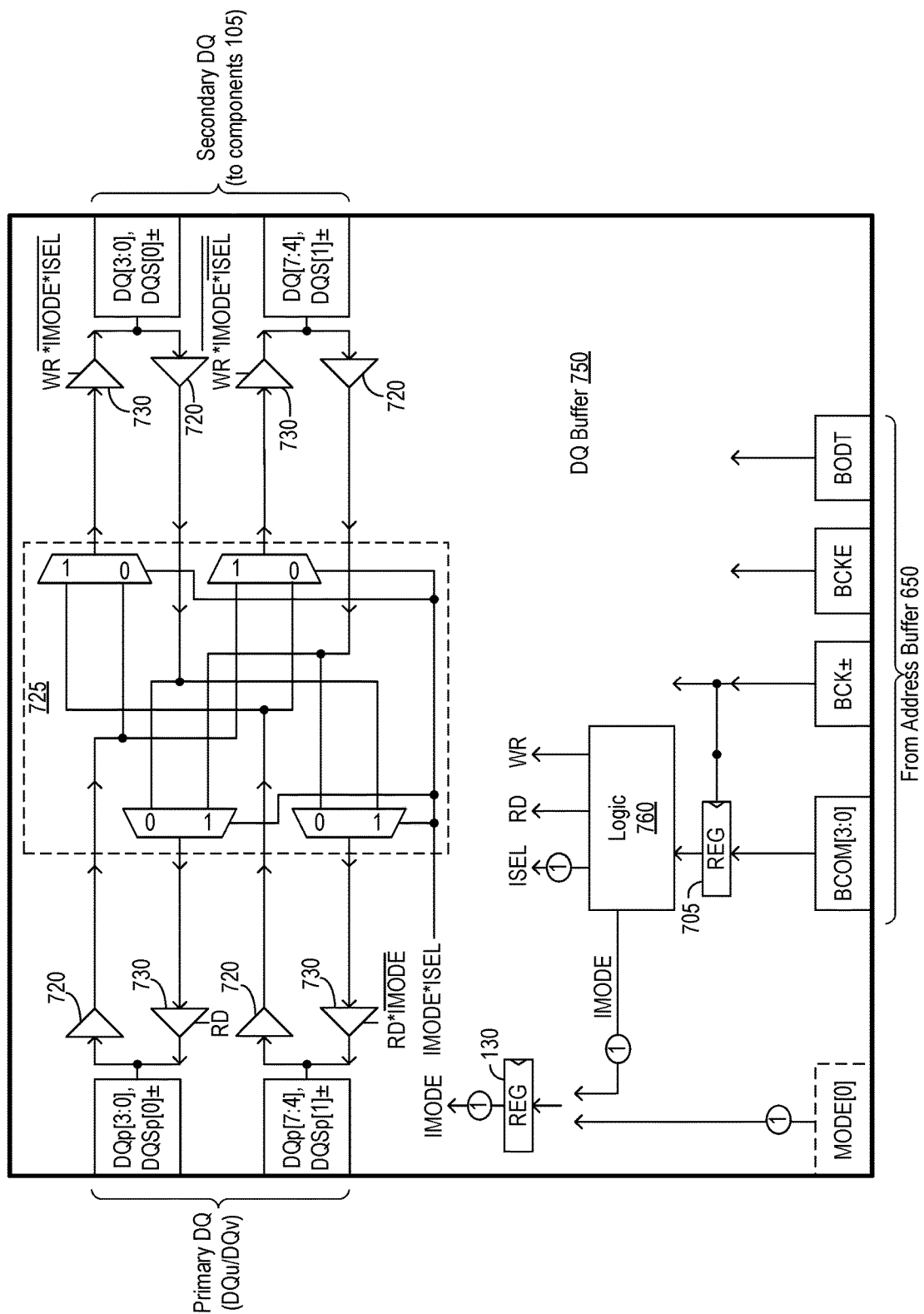
FIG. 7B depicts a data-buffer component 750 in accordance that can be used in lieu of data-buffer component 110 of FIGS. 1A, 1B, and 4.

FIG. 7B depicts a data-buffer component 750 in accordance that can be used in lieu of data-buffer component 110 of FIGS. 1A, 1B, and 4. Data-buffer component 750 is similar to data-buffer component 110 of FIG. 7A, so a detailed discussion is omitted. In this embodiment the select signal is conveyed to data-buffer component 750 by encoding an instruction as a four-bit command communicated over lines BCOM[3:0]. Logic 760 decodes the select command and other commands from e.g. address buffer 650 (FIG. 6B), and otherwise functions as noted above in connection with FIG. 7A.

Figure 8:
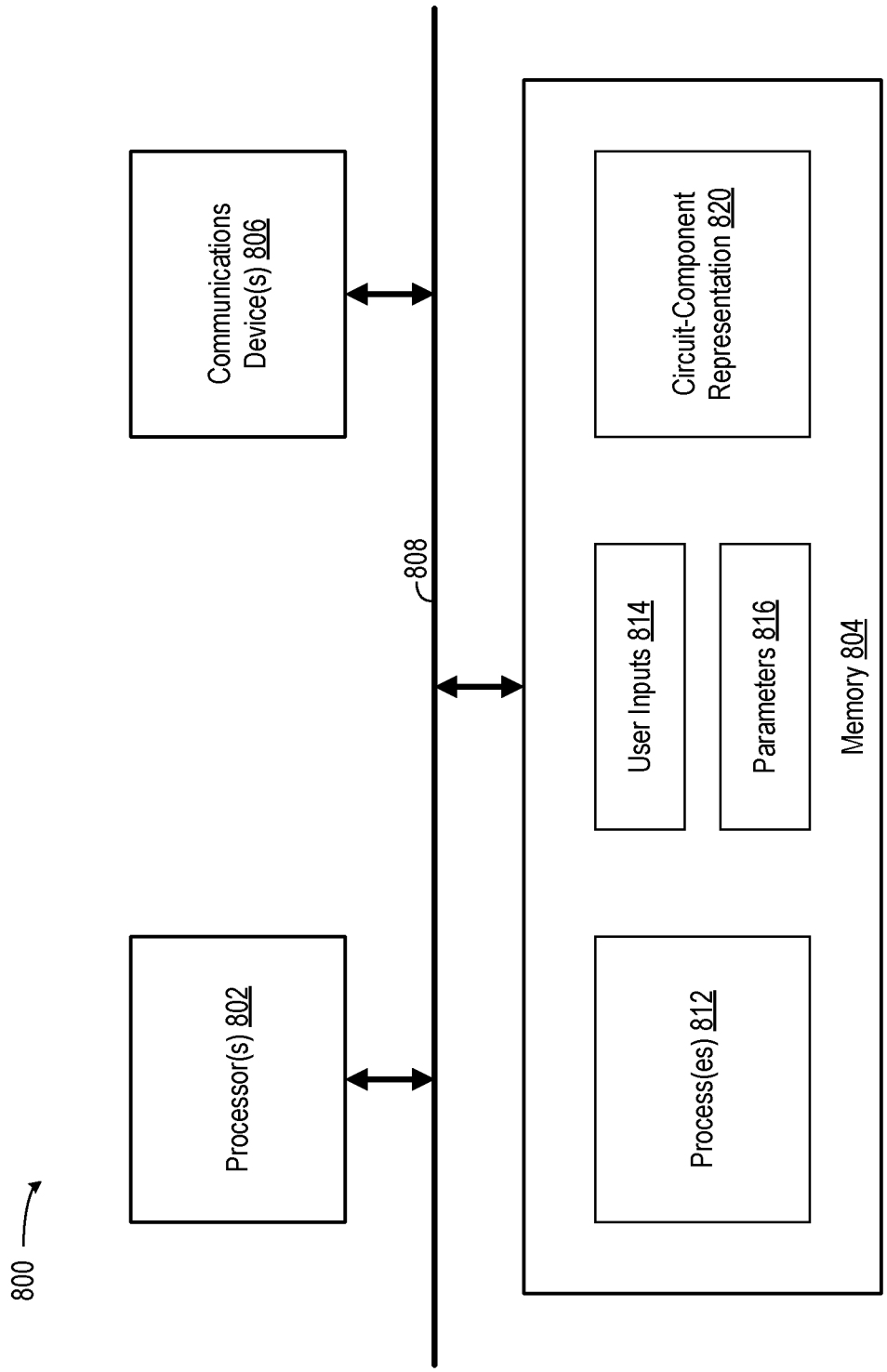
FIG. 8 is a block diagram illustrating one embodiment of a processing system 800 for processing or generating a representation of a circuit component 820.

FIG. 8 is a block diagram illustrating one embodiment of a processing system 800 for processing or generating a representation of a circuit component 820. Electronic design automation (EDA or ECAD) refers to a category of software tools used to design, simulate, and test electronic systems, including integrated-circuit (IC) devices and printed-circuit (PC) boards. EDA tools run on processing systems, of which processing system 800 is a representative example. Processing system 800 includes one or more processors 802, a memory 804, and one or more communications devices 806. Processors 802, memory 804, and communications devices 806 communicate using any suitable type, number, and/or configuration of wired and/or wireless connections 808.

Processors 802 execute instructions of one or more processes 812 stored in a memory 804 to process and/or generate a representation 820 of a circuit component responsive to user inputs 814 and parameters 816. Processes 812 may be any suitable electronic design automation tool or portion thereof used to design, simulate, analyze, and/or verify electronic circuitry and/or generate photomasks used in the fabrication of electronic circuitry. Representation 820 includes data structures that describe all or portions of module 100, introduced in FIGS. 1A and 1B, including data-buffer component 110 and address-buffer component 115. These data structures are stored in memory 804, which includes any suitable type, number, and/or configuration of non-transitory computer-readable storage media that stores processes 812, user inputs 814, parameters 816, and circuit component 820.

Although various formats may be used to encode data structures and other such information for representing integrated circuits, such information is commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures in memory 804. Those of skill in the art of integrated circuit fabrication can use such encoded data to fabricate integrated circuits comprising one or more of the circuits described herein.

Communications devices 806 include any suitable type, number, and/or configuration of wired and/or wireless devices that transmit information from processing system 800 to another processing or storage system (not shown) and/or receive information from another processing or storage system (not shown). For example, communications devices 806 may transmit circuit component 820 to another system. Communications devices 806 may receive processes 812, user inputs 814, parameters 816, and/or circuit component 820 and cause processes 812, user inputs 814, parameters 816, and/or circuit component 820 to be stored in memory 804.

Figure 9:
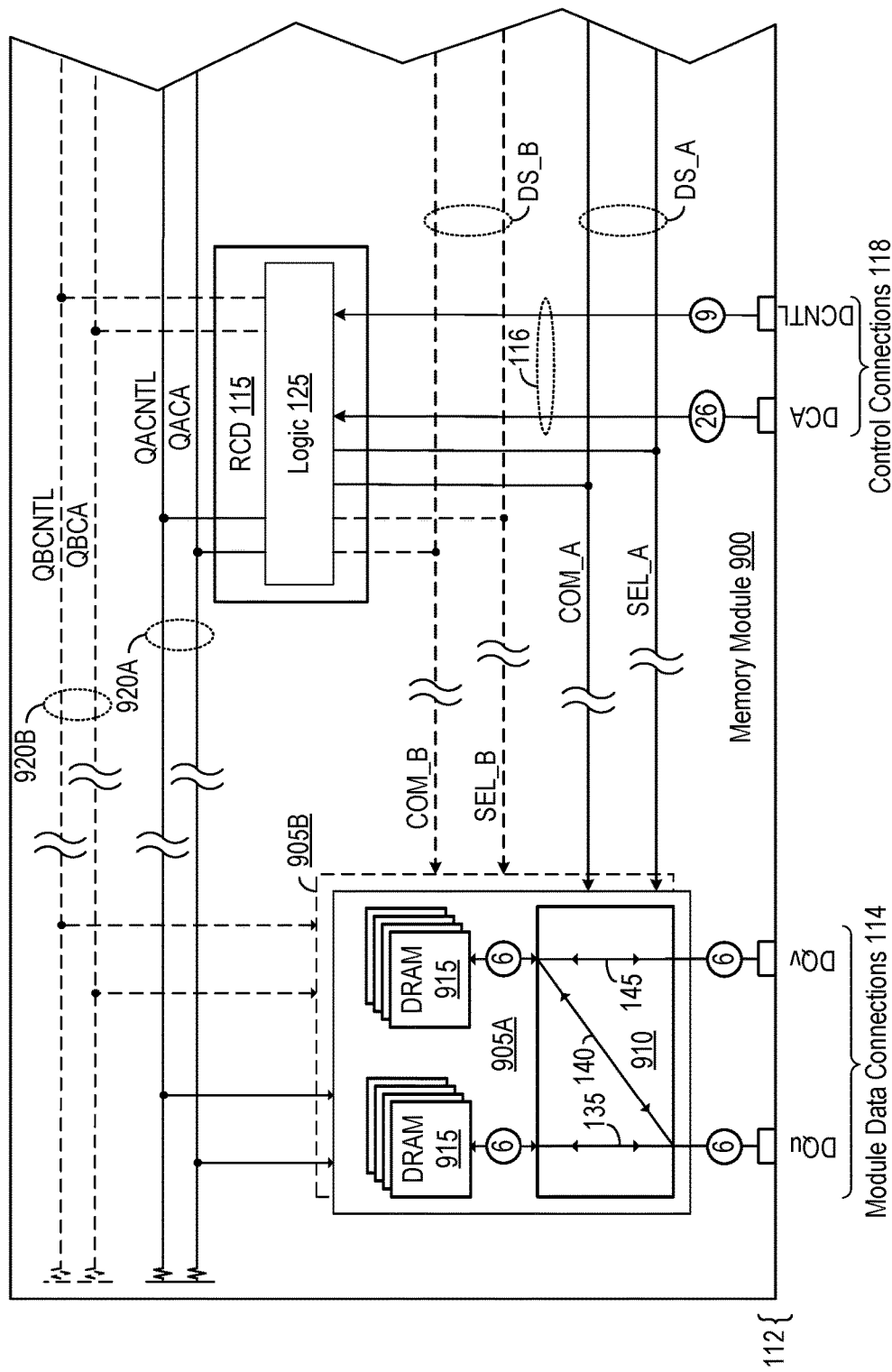
FIG. 9 depicts a portion of the left side of a module 900 in accordance with an embodiment in which data-buffer functionality is integrated with memory components 905A and 905B, which are respectively mounted on the front and back sides of module 900.

FIG. 9 depicts a portion of the left side of a module 900 in accordance with an embodiment in which data-buffer functionality is integrated with memory components 905A and 905B, which are respectively mounted on the front and back sides of module 900. Module 900 is similar to module 100 of FIGS. 1A and 1B, with like-identified elements being the same or similar. As with the example of FIG. 1B, elements of module 900 are omitted for ease of illustration.

Memory component 905A is comprised of a stack of ICs. One, which may be termed the "master" die, includes data-buffer circuitry 910 and may include DRAM circuitry 915. Additional DRAM dies are stacked with the master die and interconnected with the master die using e.g. through-silicon vias (TSVs). Each component 905A can thus include a stack of e.g. eight DRAM die that can be chip-selected via a secondary bus 920A. Data-buffer circuitry 910 can steer data responsive to signals on busses COM_A and SEL_A as detailed in connection with FIGS. 1A and 1B.

Module 900 has memory components 905B, identical to memory components 905A, on the backside. Components 905B can be chip-selected via a secondary bus 920B, and steer data responsive to signals on busses COM_B and SEL_B. Pairs of components 905A and 905B share a set of module data connections DQu and DQv.

Buffer circuitry 910 communicates either via the low-order nibble (port DQu) in the narrow mode or both the low- and high-order nibbles (ports DQu and DQv) in the wide mode. In other embodiments buffer circuitry 910 can communicate via either the low- or the high-order nibbles.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. More generally, any of the specific numbers of bits, signal path widths, signaling or operating frequencies, circuits or devices and the like may be different from those described above in alternative embodiments.

Signals and signaling paths shown or described as being single-ended may also be differential, and vice-versa. Similarly, signals described or depicted as having active-high or active-low logic levels may have opposite logic levels in alternative embodiments. Circuitry within integrated circuit devices may be implemented using metal oxide semiconductor (MOS) technology, bipolar technology or any other technology in which logical and analog circuits may be implemented.

With respect to terminology, a signal is said to be "asserted" when the signal is driven to a low or high logic state (or charged to a high logic state or discharged to a low logic state) to indicate a particular condition. Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or open collector condition).

A signal driving circuit is said to "output" a signal to a signal receiving circuit when the signal driving circuit asserts (or de-asserts, if explicitly stated or indicated by context) the signal on a signal line coupled between the signal driving and signal receiving circuits. A line over a signal name may also be used to indicate an active low signal.

Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the present invention has been described in connection with specific embodiments, after reading this disclosure variations of these embodiments will be apparent to those of ordinary skill in the art. For example, some or all of the functionality of data-buffer components 110 can be integrated into the packaging or devices of components 105, or into address-buffer component 115. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A memory module comprising:
   a printed-circuit (PC) board having a first side and a second side;
   a first set of memory components on the first side of the PC board;
   first data-buffer circuitry on the first side of the PC board and connected to the first set of memory components to communicate first data to and from the first set of memory components;
   a second set of memory components on the second side of the PC board;
   second data-buffer circuitry on the second side of the PC board and connected to the second set of memory components to communicate second data to and from the second set of memory components; and
   an address-buffer component on the first side of the PC board, the address-buffer component for reading and steering the first data from the first set of memory components to a memory controller via the first data-buffer circuitry and the second data from the second set of memory components to the memory controller via the second data-buffer circuitry, the address-buffer component comprising:
      a primary control interface to receive primary commands and primary addresses from the memory controller; and
      logic to selectively interpret the primary commands and the primary addresses and responsively convey:
         first secondary commands and first secondary addresses to the first set of memory components;
         second secondary commands and second secondary addresses to the second set of memory components;
         first data-steering signals to the first data-buffer circuitry on the first side of the PC board to direct the first data from the first set of memory components to the memory controller via the first data-buffer circuitry; and
         second data-steering signals to the second data-buffer circuitry on the second side of the PC board to direct the second data from the second set of memory components to the memory controller via the second data-buffer circuitry.

2. The memory module of claim 1, the address-buffer component further comprising:
   a first secondary control interface to convey the first secondary commands to the first set of memory components;
   a second secondary control interface to convey the second secondary commands to the second set of memory components;
   a first communication interface to convey the first data-steering signals to the first data-buffer circuitry; and a second communication interface to convey the second data-steering signals to the second data-buffer circuitry.

3. The memory module of claim 2, wherein the first secondary control interface includes a first secondary chip-select interface and the second secondary control interface includes a second secondary chip-select interface, and wherein the logic selectively disables one of the first and second secondary chip-select interfaces responsive to primary chip-select signals on the primary control interface in a first-width-data mode.

4. The memory module of claim 3, wherein the logic selectively disables the one of the first and second secondary chip-select interfaces responsive to the primary chip-select signals.

5. The memory module of claim 1, wherein the logic supports a first-width-data mode in which the logic successively conveys one of the first secondary addresses to the first set of memory components responsive to a first of the primary addresses and one of the second secondary addresses to the second set of memory components responsive to a second of the primary addresses.

6. The memory module of claim 5, wherein the logic supports a second-width-data mode in which the logic simultaneously conveys one of the first secondary addresses to the first set of memory components and one of the second secondary addresses to the second set of memory components responsive to one of the primary addresses.

7. The memory module of claim 6, further comprising a mode register to store a mode value selecting one of the first-width-data mode and the second-width-data mode.

8. The memory module of claim 1, the primary control interface to receive a primary clock signal and distribute secondary clock signals to the first set of memory components, the second set of memory components, and the first and second data-buffer circuitry.

9. The memory module of claim 8, wherein the address-buffer component buffers the primary clock signal to produce the secondary clock signals.

10. The memory module of claim 1, wherein the data steering signals comprise termination control signals.

11. A memory module comprising:
a printed-circuit (PC) board having a first side, a second side, and a module connector with module data connections and module control connections;
an address-buffer component coupled to the module control connections via a module control interface;
a first memory die on the first side of the PC board and coupled to the address-buffer component via a first memory-die control interface;
a second memory die on the second side of the PC board and coupled to the address-buffer component via a second memory-die control interface; and
a first data-buffer component on the first side of the PC board and coupled between a first subset of the module data connections and the first memory die; and
a second data-buffer component on the second side of the PC board and coupled between a second subset of the module data connections and the second memory die;
the first and second data-buffer components supporting:
a first-width-data mode to steer first-width data on the first subset of module data connections to the first memory die and the second memory die; and
a second-width-data mode to steer second-width data on the first and second subsets of module data connections to only one of the first memory die and the second memory die;

the address-buffer component simultaneously asserting a first chip-select signal on the first memory-die control interface and a second chip-select signal the second memory-die control interface in the first-width-data mode and asserting only one of the first chip-select signal and the second chip-select signal in the second-width-data mode.

12. The memory module of claim 11, the data-buffer component including a data-buffer register to store a mode value selecting one of the first-width-data mode and the second-width-data mode.

13. The memory module of claim 12, wherein the address-buffer component loads the data-buffer register responsive to control signals from the module control connections.

14. The memory module of claim 11, wherein the address-buffer component selects the one of the first memory-die control interface and the second memory-die control interface in the second-width-data mode responsive to a control signal on the module control connections.

15. The memory module of claim 11, wherein the first data-buffer component is coupled to a number of the module data connections and to the first memory die half the number of the module data connections.

16. The memory module of claim 15, wherein the number is eight.

17. The memory module of claim 11, the address-buffer component including an address-buffer register to store a mode value selecting one of the first-width-data mode and the second-width-data mode.

18. A memory comprising:
a printed-circuit (PC) board having a first side, a second side, and a connector with data connections and control connections;
an address-buffer component on the first side of the PC board and coupled to the control connections;
a first memory die on the first side of the PC board and coupled to the address-buffer component via a first memory-die control interface;
a second memory die on the second side of the PC board and coupled to the address-buffer component via a second memory-die control interface; and
a first data-buffer component on the first side of the PC board and coupled between a first subset of the data connections and the first memory die; and
a second data-buffer component on the second side of the PC board and coupled between a second subset of the data connections and the second memory die;
the first and second data-buffer components supporting:
a first-width-data mode to steer first-width data on a first subset of the data connections to the first memory die and the second memory die; and
a second-width-data mode to steer second-width data on the first subset of the data connections and a second subset of the data connections to only one of the first memory die and the second memory die;
the address-buffer component simultaneously asserting a first chip-select signal on the first memory-die control interface and a second chip-select signal the second memory-die control interface in the first-width-data mode and asserting only one of the first chip-select signal and the second chip-select signal in the second-width-data mode.

* * * * *